United States Patent
Yang et al.

(10) Patent No.: US 11,035,386 B2
(45) Date of Patent: Jun. 15, 2021

(54) MOTOR OIL PUMP ASSEMBLY, STEERING SYSTEM, AND VEHICLE

(71) Applicant: BYD COMPANY LIMITED, Guangdong (CN)

(72) Inventors: Shenglin Yang, Shenzhen (CN); Jun Li, Shenzhen (CN); Kunzhen Yang, Shenzhen (CN); Yan Liu, Shenzhen (CN); Guojie Rao, Shenzhen (CN); Tao Wang, Shenzhen (CN); Hui Xue, Shenzhen (CN); Yanzi Li, Shenzhen (CN); Taiji Chen, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 165 days.

(21) Appl. No.: 16/336,056

(22) PCT Filed: Sep. 26, 2017

(86) PCT No.: PCT/CN2017/103362
§ 371 (c)(1),
(2) Date: Mar. 22, 2019

(87) PCT Pub. No.: WO2018/059385
PCT Pub. Date: Apr. 5, 2018

(65) Prior Publication Data
US 2019/0219069 A1    Jul. 18, 2019

(30) Foreign Application Priority Data

Sep. 28, 2016    (CN) .......................... 201610856918.5

(51) Int. Cl.
F04D 29/66    (2006.01)
F04B 23/02    (2006.01)
(Continued)

(52) U.S. Cl.
CPC ............ *F04D 29/669* (2013.01); *F01C 21/10* (2013.01); *F04B 17/03* (2013.01); *F04B 23/023* (2013.01);
(Continued)

(58) Field of Classification Search
CPC ...... F04B 17/03; F04B 23/023; F04B 53/002; F04B 53/16; F04C 2/08–20;
(Continued)

(56) References Cited

U.S. PATENT DOCUMENTS 3,207,077 A    9/1965 Zeigler et al.
3,263,425 A *  8/1966 Rohde .................... F15B 7/006
                                                    60/475
(Continued)

FOREIGN PATENT DOCUMENTS

CA    2394287 A    6/2002
CN    101096949 A    1/2008
(Continued)

*Primary Examiner* — Alexander B Comley
(74) *Attorney, Agent, or Firm* — Calfee Halter & Griswold LLP

(57) ABSTRACT

A motor oil pump assembly includes: a motor component; an oil pump component, where the oil pump component is supported on an end cover of the motor component; an inner sound insulation enclosure, where the inner sound insulation enclosure encloses the oil pump component, and the inner sound insulation enclosure and the oil pump component define an inner sound insulation cavity filled with low-pressure oil; and a pre-tightening buffering component, where the pre-tightening buffering component is pressed between an upper end cover of the oil pump component and the inner sound insulation enclosure, and the pre-tightening buffering component is in communication with a high-pressure cavity of the oil pump component.

17 Claims, 21 Drawing Sheets

(51) Int. Cl.
  *F04B 17/03* (2006.01)
  *F04B 53/00* (2006.01)
  *F04B 53/16* (2006.01)
  *B62D 5/06* (2006.01)
  *F04C 15/00* (2006.01)
  *F04C 11/00* (2006.01)
  *F01C 21/10* (2006.01)
  *F04C 2/00* (2006.01)
  *F04C 2/14* (2006.01)

(52) U.S. Cl.
  CPC ............ *F04B 53/002* (2013.01); *F04B 53/16* (2013.01); *F04C 11/008* (2013.01); *F04C 15/0049* (2013.01); *B62D 5/064* (2013.01); *F04C 2/00* (2013.01); *F04C 2/14* (2013.01)

(58) Field of Classification Search
  CPC .......... F04C 11/008; F04C 29/065–066; F04C 15/0049; F04D 29/669; B62D 3/14; B62D 5/064; F01C 21/10
  USPC ................. 417/312, 410.3, 410.4; 418/206.1
  See application file for complete search history.

(56) References Cited

U.S. PATENT DOCUMENTS

| | | | | |
|---|---|---|---|---|
| 3,788,770 A * | 1/1974 | Johnson | ................... | F04C 14/02 417/62 |
| 3,936,238 A * | 2/1976 | Wycliffe | ................ | F01C 21/10 417/312 |
| 4,525,126 A * | 6/1985 | Laumont | ............... | F04C 11/008 417/310 |
| 4,627,793 A | 12/1986 | Kuroyanagi et al. | | |
| 5,236,315 A | 8/1993 | Hamao et al. | | |
| 5,332,371 A * | 7/1994 | Dantlgraber | .......... | F04B 1/2014 417/271 |
| 5,354,182 A * | 10/1994 | Niemiec | ............... | F01C 21/007 248/638 |
| 5,360,322 A * | 11/1994 | Henein | .............. | B60G 17/0152 417/313 |
| 5,692,883 A * | 12/1997 | Vourc'h | .................. | F04C 11/00 417/312 |
| 5,725,362 A * | 3/1998 | Zepp | ....................... | F04C 2/086 417/366 |
| 5,997,258 A | 12/1999 | Sawyer, III et al. | | |
| 6,004,119 A * | 12/1999 | Hamasaki | ............... | F04C 11/00 418/181 |
| 6,048,187 A * | 4/2000 | Hamasaki | ............... | F04C 11/008 417/366 |
| 6,132,184 A * | 10/2000 | Robertson | ............... | F04D 13/06 417/366 |
| 6,146,113 A * | 11/2000 | Fassnacht | ............... | F04B 17/03 417/367 |
| 6,158,983 A * | 12/2000 | Harpole | ................. | B62D 5/062 310/67 R |
| 6,183,213 B1 * | 2/2001 | Robertson | ............... | B62D 5/064 417/312 |
| 6,254,358 B1 | 7/2001 | Merz | | |
| 6,287,090 B1 * | 9/2001 | Hamasaki | ............... | F01C 21/10 417/360 |
| 6,309,187 B1 * | 10/2001 | Robertson | ............... | B62D 5/064 417/312 |
| 6,322,329 B1 * | 11/2001 | Vera | ................... | F02M 37/0041 417/313 |
| 6,506,029 B1 * | 1/2003 | Reichenmiller | ........ | F04C 11/00 181/241 |
| 7,488,160 B2 * | 2/2009 | Jordan | ................... | B62D 5/064 417/366 |
| 7,488,162 B2 * | 2/2009 | Jordan | ................... | F04C 2/086 417/310 |
| 7,799,074 B2 * | 9/2010 | Grimme | ................ | F04C 2/082 623/3.24 |
| 8,133,037 B2 * | 3/2012 | Fischer | ............... | F04C 15/0042 417/312 |
| 8,535,019 B2 * | 9/2013 | Gummersbach | ........ | F04C 11/00 417/363 |
| 8,591,203 B2 * | 11/2013 | Yoshihara | ........... | F04B 11/0008 417/423.14 |
| 2004/0241009 A1 * | 12/2004 | Dinkel | .................. | F04B 1/0426 417/221 |
| 2007/0274848 A1 * | 11/2007 | Arbogast | ................ | F04B 17/03 417/423.1 |
| 2008/0003116 A1 | 1/2008 | Gummersbach et al. | | |
| 2013/0195697 A1 * | 8/2013 | Kim | ...................... | H02K 11/33 417/410.4 |

FOREIGN PATENT DOCUMENTS

| | | |
|---|---|---|
| CN | 201068857 Y | 6/2008 |
| CN | 201241828 Y | 5/2009 |
| CN | 201560979 U | 8/2010 |
| CN | 101943164 A | 1/2011 |
| CN | 102734172 A | 10/2012 |
| CN | 104118473 A | 10/2014 |
| CN | 204419616 U | 6/2015 |
| CN | 204419617 U | 6/2015 |
| CN | 105134664 A | 12/2015 |
| CN | 105443448 A | 3/2016 |
| CN | 105464992 A | 4/2016 |
| CN | 205370968 U | 7/2016 |
| CN | 105822550 A | 8/2016 |
| DE | 102012005431 B3 | 3/2013 |
| EP | 0782672 A1 | 12/1998 |
| GB | 2097495 A | 11/1982 |
| GB | 2356414 A | 5/2001 |
| JP | 16238084 U | 8/1985 |
| JP | 14849384 U | 4/1986 |
| JP | 07-027083 A | 1/1990 |
| JP | 45009110 B1 | 2/1992 |
| JP | 62-097287 U | 1/1997 |
| JP | 111294345 A | 10/1999 |
| JP | 2011102544 A | 5/2011 |
| WO | 2012140590 A | 10/2012 |

\* cited by examiner (a)                  (b)

MOTOR OIL PUMP ASSEMBLY, STEERING SYSTEM, AND VEHICLE

CROSS-REFERENCE TO RELATED APPLICATIONS

This application is the U.S. national phase entry of PCT Application No. PCT/CN2017/103362, filed Sep. 26, 2017, which is based upon and claims priority to Chinese Patent Application No. 201610856918.5, filed Sep. 28, 2016, the entire contents of which are incorporated herein by reference.

FIELD

The present disclosure relates to the field of vehicle manufacturing technologies, and specifically, to a motor oil pump assembly, a steering system having the motor oil pump assembly, and a vehicle having the steering system.

BACKGROUND

A motor oil pump assembly is widely applied to a steering system of a vehicle. In the related art, an oil pump component is immersed in high-pressure oil, and the outer side of the oil pump component is provided with a high-pressure cavity, so that a high-strength casing needs to be designed to seal the high-pressure cavity, which imposes quite high requirements on the casting process of the casing and the seal performance of the high-pressure cavity. Moreover, the thickness of the casing is relatively large, which does not meet a lightweight requirement. Further, vibration and noise generated by the oil pump component in an operating process are relatively large. In the related art, noise is usually isolated by disposing various damping elements, and the damping elements are complex in structure, occupies relatively large mounting space, and are high in production costs and complex in mounting process. As a result, there is room for improvement.

SUMMARY

An objective of the present disclosure is to at least resolve one of the technical problems in the related art to some extent. To this end, an objective of the present disclosure is to propose a motor oil pump assembly that is low in operating noise and high in lightweight level.

Another objective of the present disclosure is to propose a steering system having the foregoing motor oil pump assembly.

Another objective of the present disclosure is to propose a vehicle having the foregoing steering system.

A motor oil pump assembly according to an embodiment of a first aspect of the present disclosure includes: a motor component; an oil pump component, where the oil pump component is supported on an end cover of the motor component; an inner sound insulation enclosure, where the inner sound insulation enclosure encloses the oil pump component, and the inner sound insulation enclosure and the oil pump component define an inner sound insulation cavity filled with low-pressure oil; and a pre-tightening buffering component, where the pre-tightening buffering component is pressed between an upper end cover of the oil pump component and the inner sound insulation enclosure, and the pre-tightening buffering component is in communication with a high-pressure cavity of the oil pump component.

Based on the motor oil pump assembly according to the embodiment of the first aspect of the present disclosure, space between the inner sound insulation enclosure and the oil pump component is filled with low-pressure oil, to help implement lightweight of the motor oil pump assembly, and the motor oil pump assembly is small in occupied by space, low in manufacturing costs, and small in operating noise.

A steering system according to an embodiment of a second aspect of the present disclosure is provided with any motor oil pump assembly according to the first aspect.

The steering system and the foregoing motor oil pump assembly have a same advantage relative to the prior art, and details are not described herein again.

A vehicle according to an embodiment of a third aspect of the present disclosure is provided with any steering system according to the second aspect.

The vehicle and the foregoing steering system have a same advantage relative to the prior art, and details are not described herein again.

BRIEF DESCRIPTION OF THE DRAWINGS

The foregoing and/or additional aspects and advantages of this disclosure become obvious and easily understood in descriptions of the embodiments with reference to the following accompanying drawings.

DETAILED DESCRIPTION

Figure 1:
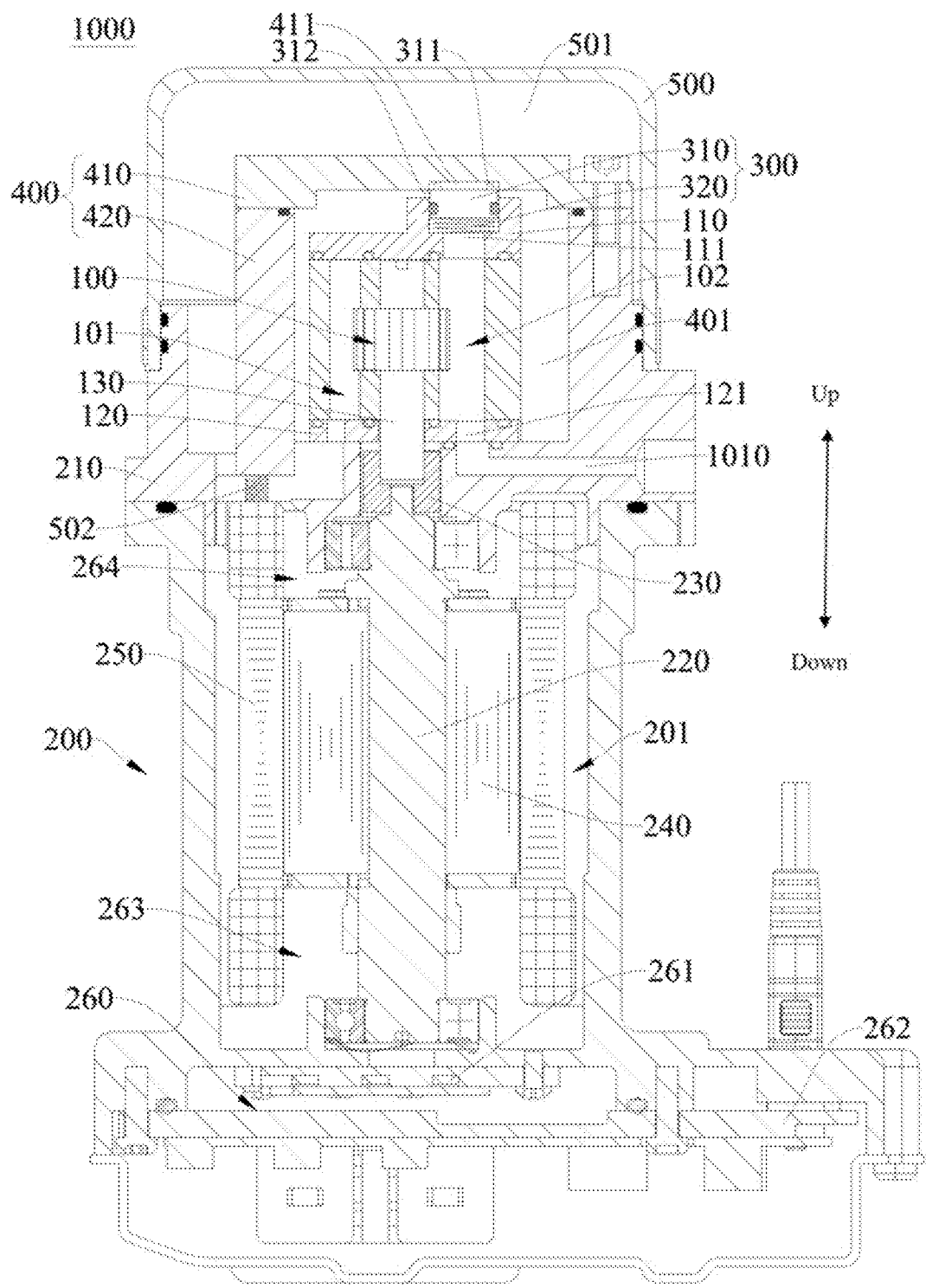
FIG. 1 is a schematic structural diagram of a motor oil pump assembly according to a first embodiment of the present disclosure.
Figure 2:
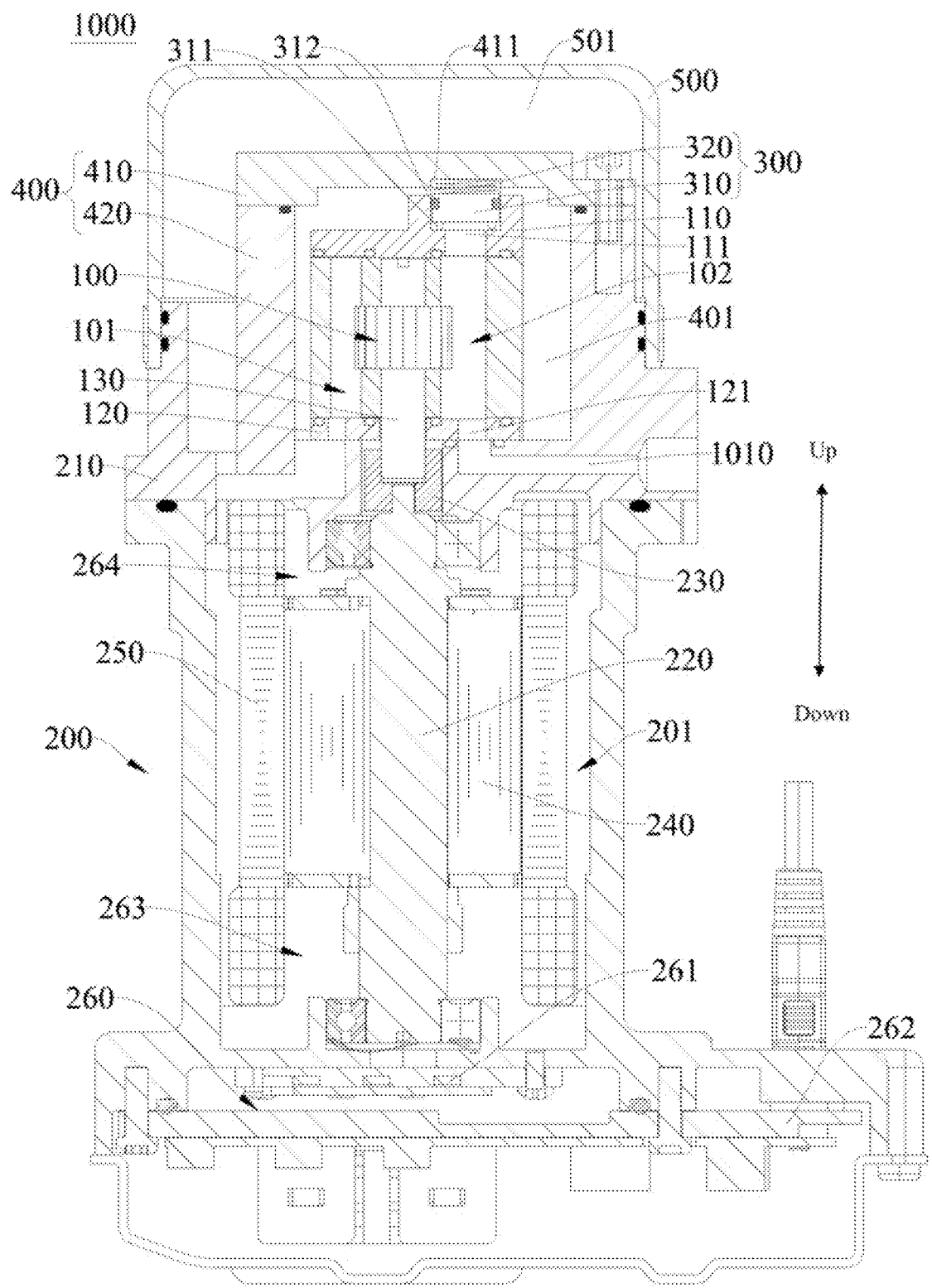
FIG. 2 is a schematic structural diagram of a motor oil pump assembly according to a second embodiment of the present disclosure.

The following describes embodiments of the disclosure in detail. Examples of the embodiments are shown in the accompanying drawings. The same or similar elements and the elements having same or similar functions are denoted by like reference numerals throughout the descriptions. The embodiments described below with reference to the accompanying drawings are exemplary, aim to explain the disclosure, but cannot be understood as a limitation on the disclosure.

In the present disclosure, terms "first" and "second" are used only for description objectives, and shall not be construed as indicating or implying relative importance or implying a quantity of indicated technical features. Therefore, a feature restricted by "first" or "second" may explicitly indicate or implicitly include at least one such feature. In the description of the present disclosure, unless otherwise specifically limited, "multiple" means at least two, for example, two or three.

The present disclosure is described in detail below with reference to the accompanying drawings and the embodiments.

A motor oil pump assembly 1000 according to an embodiment of the present disclosure is first described in detail with reference to the accompanying drawings.

As shown in FIG. 1 to FIG. 21, the motor oil pump assembly 1000 includes a motor component 200, an oil pump component 100, an inner sound insulation enclosure 400, and a pre-tightening buffering component 300.

The motor component 200 is used to provide a driving force for operating of the oil pump component 100. For example, a motor shaft 220 of the motor component 200 may be connected to an input shaft 130 of the oil pump component 100 by using a coupling 230. Certainly, the motor component 200 is not limited to directly driving the oil pump component 100, and may be further connected to the oil pump component 100 by using a transmission mechanism such as a gearbox or a reducer.

The oil pump component 100 driven by the motor component 200 operates, so as to convert low-pressure oil into high-pressure oil to be output. The oil pump component 100 may be an outer meshing gear pump, a cycloidal gear pump, a vane pump, a plunger pump, or the like. The oil pump component 100 may be supported on an end cover 210 of the motor component 200. For example, a lower end cover 120 of the oil pump component 100 may be supported on the end cover 210 of the motor component 200.

The inner sound insulation enclosure 400 encloses the oil pump component 100, there is an inner sound insulation cavity 401 defined by the inner sound insulation enclosure 400 and the oil pump component 100, and the inner sound insulation cavity 401 is filled with low-pressure oil. The inner sound insulation cavity 401 may be in communication with a low-pressure cavity 101 (hydraulic oil input cavity) of the oil pump component 100.

In other words, periphery of the oil pump component 100 is wrapped by the low-pressure oil, the pressure in the inner sound insulation cavity 401 is small, sealing is facilitated, and the inner sound insulation enclosure 400 does not play a role of a high-pressure container and is unnecessarily limited to being affected by strength, to provide a possibility of lightweight design. A wall of the inner sound insulation enclosure 400 may be set to be relatively thin. For example, the inner sound insulation enclosure 400 may be made of thin metal, so as to reduce occupied space and weight of the motor oil pump assembly 1000. Moreover, vibration and noise of the oil pump component 100 may be absorbed by the low-pressure oil within the inner sound insulation cavity 401 and reflected by the inner sound insulation enclosure 400, so as to reduce operating noise of the motor oil pump assembly 1000.

The pre-tightening buffering component 300 is pressed between an upper end cover 110 of the oil pump component 100 and the inner sound insulation enclosure 400. It may be understood that, the pre-tightening buffering component 300 applies a downward pre-tightening force to the upper end cover 110 of the oil pump component 100, so that the upper end cover 110 of the oil pump component 100, an oil pump body (such as a bearing or a gear), and the lower end cover 120 tightly press against each other, so as to keep sealing performance of the oil pump component 100. Moreover, during mounting, large-torque bolt locking does not need to be performed on the oil pump component 100, and the pre-tightening force provided by the pre-tightening buffering component 300 only needs to ensure that the oil pump component 100 can be mounted. In this way, the operating friction force of the oil pump component 100 may be reduced, to improve the operating energy efficiency of the oil pump component 100, and the mechanical efficiency of the oil pump component 100 is higher.

Moreover, the direct contact area between the oil pump component 100 and other parts (various casings) is relatively small. Referring to FIG. 1 to FIG. 20, the oil pump component 100 is in contact with the end cover 210 of the motor component 200 only in a wrapping area outside the coupling 230 and an interface area from a high-pressure oil path to a steering gear. Moreover, seal rings are further disposed at an oil inlet and an oil outlet of the oil pump component 100, and the seal ring is deformed under the action of the pre-tightening force, so that a gap oil film is formed between the lower end cover 120 of the oil pump component 100 and the end cover 210 of the motor component 200. Because the contact area is small, the gap oil film and the seal ring may eliminate secondary low-frequency noise generated by vibration of the oil pump component 100 and the end cover 210, and high-frequency noise generated by operating of the oil pump component 100 may also be reflected or absorbed by the seal ring and the gap oil film.

The pre-tightening buffering component 300 is in communication with a high-pressure cavity 102 of the oil pump component 100. It may be understood that, a path of high-pressure oil of an output ripple of the oil pump component 100 is transferred to the pre-tightening buffering component 300, another path is transferred to the steering gear through an oil outlet passage 1010. For example, the pre-tightening buffering component 300 may be in communication with an upper end of the high-pressure cavity 102, and the oil outlet passage 1010 may be connected to a lower end of the high-pressure cavity 102.

Figure 21:
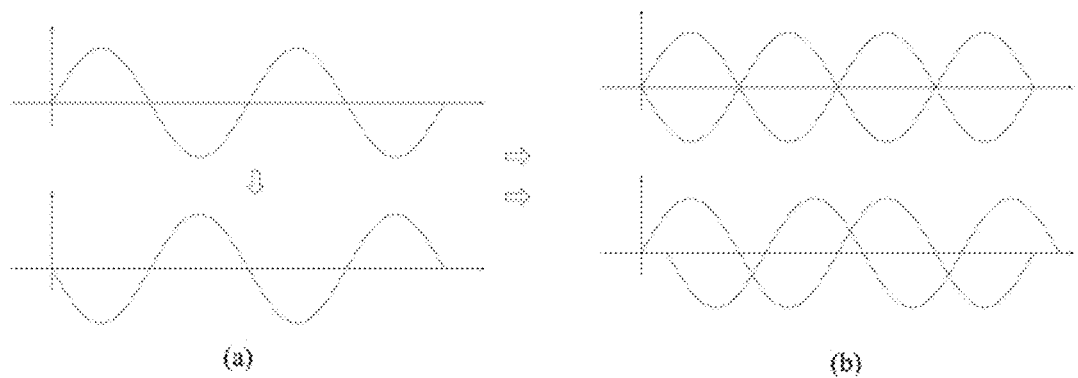
FIG. 21 is a schematic diagram of eliminating an output ripple of a motor oil pump assembly according to an embodiment of the present disclosure.

When the ripple of the high-pressure oil is conducted to the pre-tightening buffering component 300, the pre-tightening buffering component 300 may reflect the ripple. Referring to FIG. 21, FIG. (a) shows a pre-reflection ripple above, FIG. (a) shows a post-reflection ripple below, and FIG. (b) is a schematic diagram of combining two paths of ripples. A reflected ripple and a ripple that is directly transferred to the oil outlet passage 1010 form an oil liquid ripple misplacement, and two misplaced oil liquid ripples offset each other, thereby reducing or even eliminating the output ripple of the motor oil pump assembly 1000, so as to implement active noise reduction of the motor oil pump assembly 1000.

Based on the motor oil pump assembly 1000 according to the embodiment of the present disclosure, space between the inner sound insulation enclosure 400 and the oil pump component 100 is filled with low-pressure oil, to help implement lightweight of the motor oil pump assembly 1000, and the motor oil pump assembly 1000 is small in operating noise.

In some embodiments of the present disclosure, referring to FIG. 1 to FIG. 20, the inner sound insulation enclosure 400 may include a top cover 410 and a side skirt 420, the top cover 410 may be connected to the side skirt 420, the side skirt 420 may be connected to the end cover 210 of the motor component 200, the top cover 410 may be in a shape of a plate (which includes a flat plate and a bent plate), and the side skirt 420 may be substantially annular.

In some embodiments, referring to FIG. 1 to FIG. 7, FIG. 9, FIG. 11, and FIG. 16 to FIG. 20, the top cover 410 may be connected to the side skirt 420 by using a thread fastening member, a location at which the top cover 410 and the side skirt 420 are connected may be provided with a seal ring, and the side skirt 420 and the end cover 210 of the motor component 200 may be integrally formed. Therefore, the inner sound insulation enclosure 400 is simple in formation, and a quantity of seal locations is small.

In some other embodiments, referring to FIG. 8, FIG. 10, and FIG. 12 to FIG. 15, the top cover 410 and the side skirt 420 may be integrally formed, and the side skirt 420 may be connected to the end cover 210 of the motor component 200 by using a thread fastening member. In this way, the inner sound insulation enclosure 400 is simple in formation, and a quantity of seal locations is small.

There is a plurality of structure forms of the inner sound insulation enclosure 400, and only two structures of the inner sound insulation enclosure 400 are listed above. In an actual application process, the inner sound insulation enclosure 400 of an appropriate structure form may be designed according to factors such as an oil path direction of the oil pump component 100.

In some embodiments of the present disclosure, referring to FIG. 1 to FIG. 20, the motor oil pump assembly 1000 may further include an outer sound insulation enclosure 500, the outer sound insulation enclosure 500 may enclose at least a part of the inner sound insulation enclosure 400, and an outer sound insulation cavity 501 is defined between the outer sound insulation enclosure 500 and the inner sound insulation enclosure 400.

The outer sound insulation enclosure 500 may be made of a material whose inner surface is smooth and has a hole in the middle. In this way, the outer sound insulation enclosure 500 has a strong noise reflection capability and a good noise absorption effect. In some embodiments, the outer sound insulation enclosure 500 may be made of plastic or a metal nylon composite material, and the metal nylon composite material may be a composite material in which a metal net is added into a nylon base material.

The outer sound insulation cavity 501 may be filled with a plurality of materials. In some embodiments, referring to FIG. 1 to FIG. 5 and FIG. 7 to FIG. 18, the outer sound insulation cavity 501 is used for being filled with low-pressure oil. The inner sound insulation cavity 401 may be in communication with the outer sound insulation cavity 501. In an embodiment, the low-pressure oil may circulate among the outer sound insulation cavity 501, the inner sound insulation cavity 401, and the low-pressure cavity 101 of the oil pump component 100.

It should be noted that, communication between the inner sound insulation cavity 401 and the outer sound insulation cavity 501 includes direct communication and indirect communication. For example, a partition 502 may be disposed between the outer sound insulation cavity 501 and the inner sound insulation cavity 401, the partition 502 is used to prevent the low-pressure oil within the outer sound insulation cavity 501 from directly flowing to the inner sound insulation cavity 401, and the outer sound insulation cavity 501 and the inner sound insulation cavity 401 may be in indirect communication with each other through a motor cavity 201.

Figure 6:
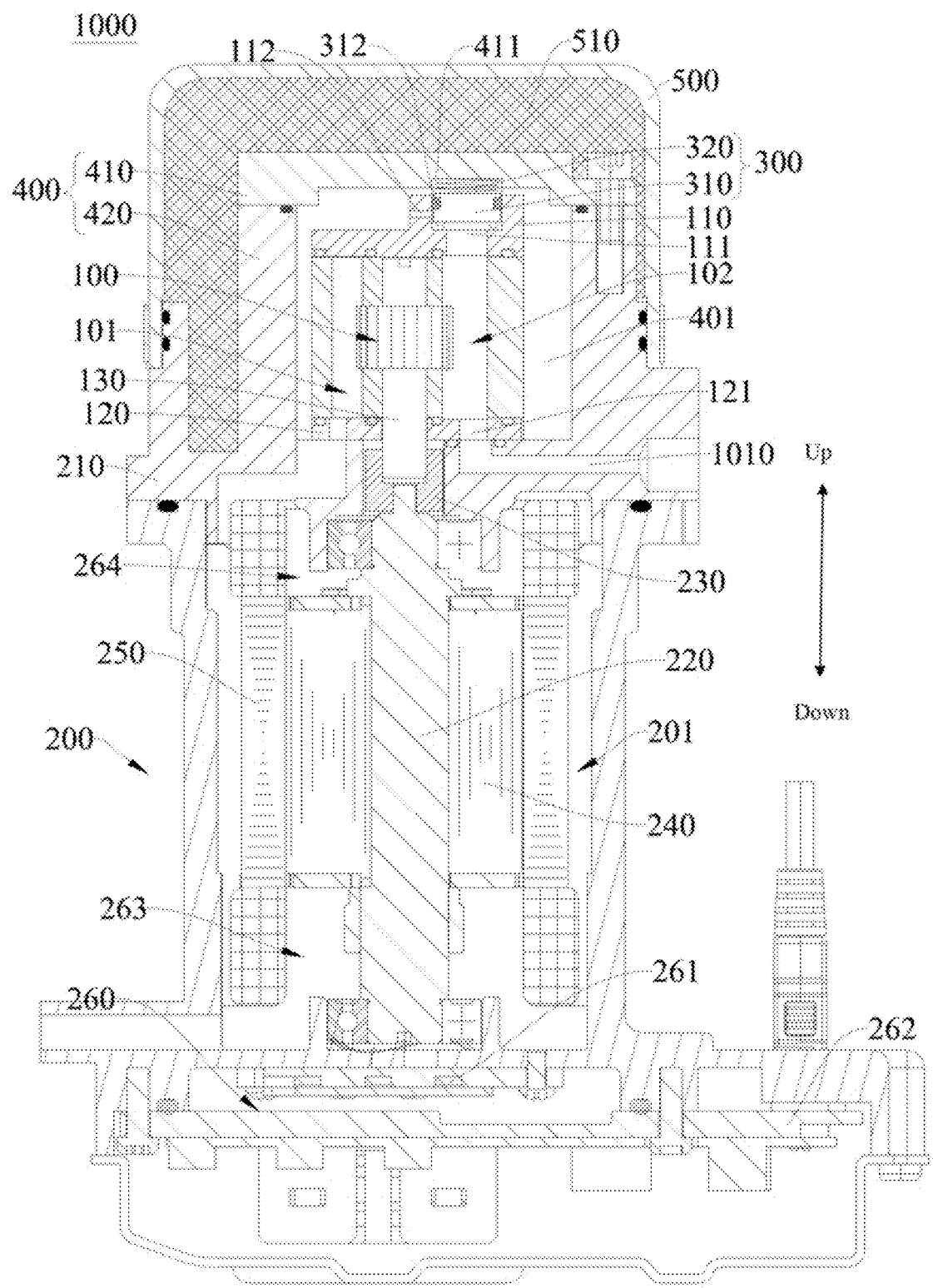
FIG. 6 is a schematic structural diagram of a motor oil pump assembly according to a sixth embodiment of the present disclosure.
Figure 19:
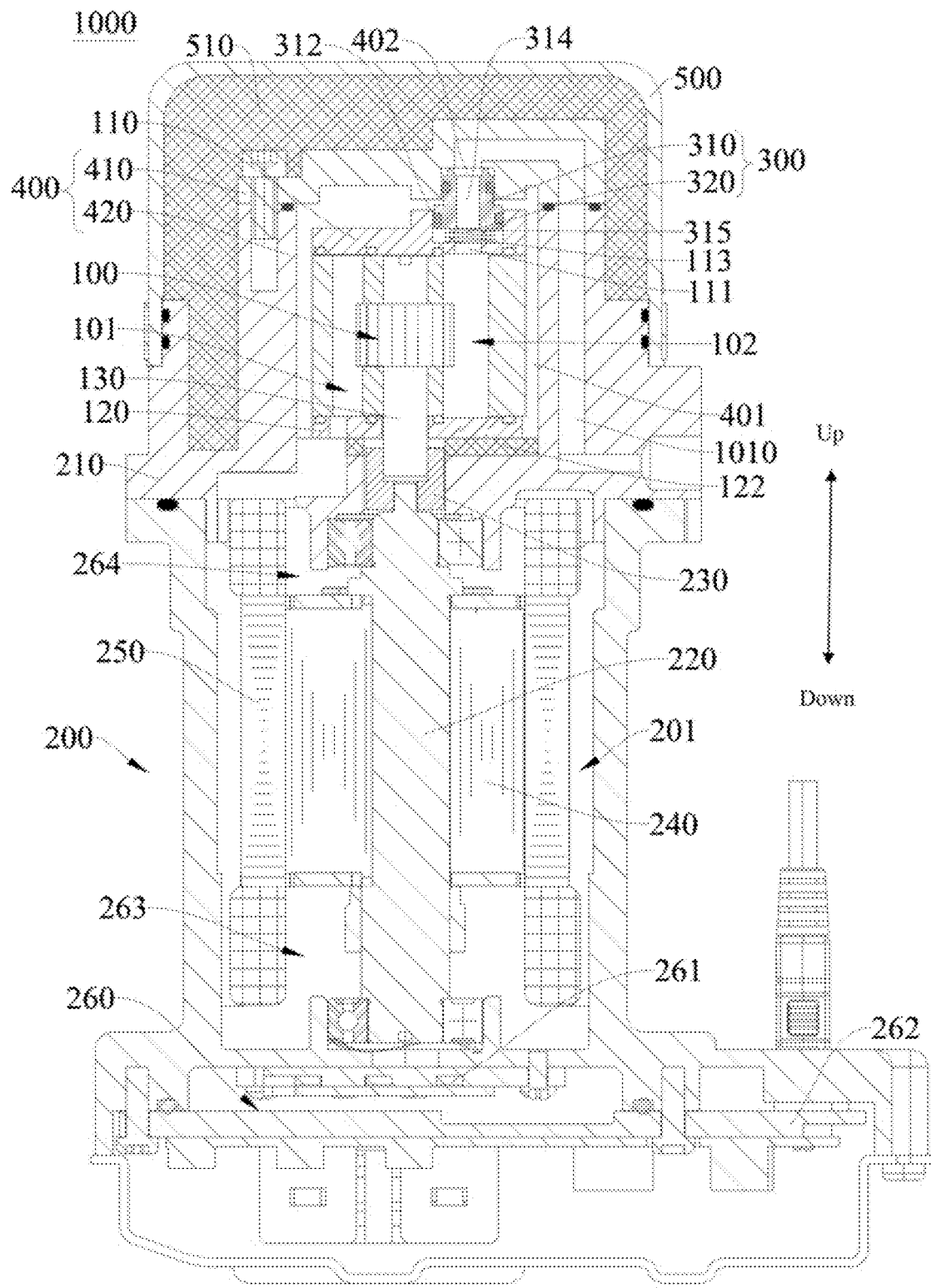
FIG. 19 is a schematic structural diagram of a motor oil pump assembly according to a nineteenth embodiment of the present disclosure.
Figure 20:
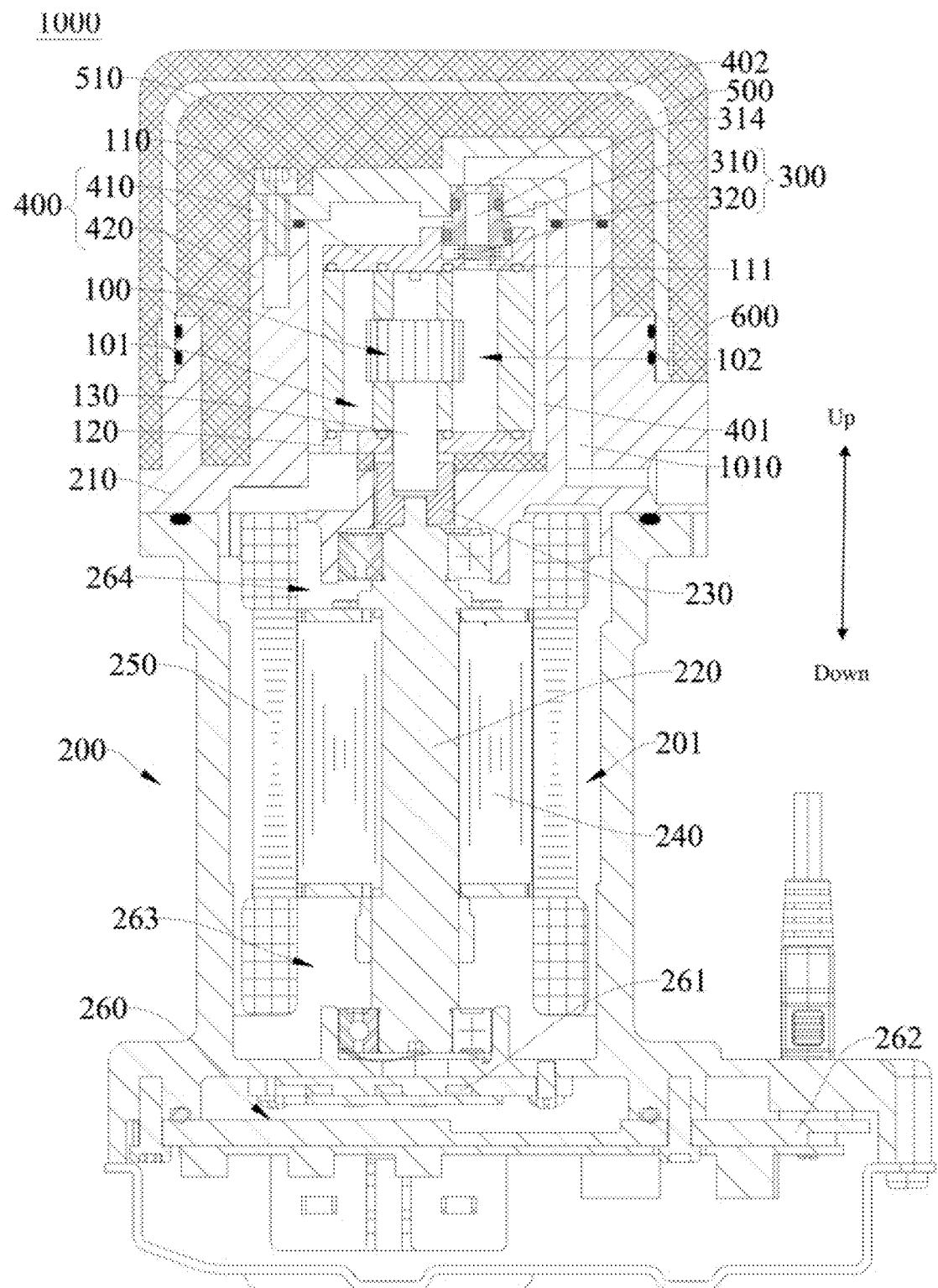
FIG. 20 is a schematic structural diagram of a motor oil pump assembly according to a twentieth embodiment of the present disclosure.

In some other embodiments, referring to FIG. 6, FIG. 19, and FIG. 20, the outer sound insulation enclosure 500 encloses the inner sound insulation enclosure 400, and space between the outer sound insulation enclosure 500 and the inner sound insulation enclosure 400 may be filled with a sound-absorbing layer 510, and the sound-absorbing layer 510 may be made of a porous material. For example, the sound-absorbing layer 510 may be sound-absorbing cotton, and a related sound-absorbing cotton parameter may be set according to frequency of noise, so as to better absorb noise exceeding the standard.

It may be understood that, through absorption and reflection of the low-pressure oil within the inner sound insulation cavity 401 and the inner sound insulation enclosure 400, a small part of the operating noise of the oil pump component 100 passes through the inner sound insulation enclosure 400. In this case, a material within the outer sound insulation cavity 501 such as the sound-absorbing cotton or the low-pressure oil further absorbs the operating noise, and the outer sound insulation enclosure 500 may also play a role of absorbing and reflecting the operating noise. In this way, the operating noise of the motor oil pump assembly 1000 may be greatly reduced through multiple times of absorption and reflection.

Referring to FIG. 20, the outer sound insulation enclosure 500 may be further covered with an outer sound-absorbing layer 600, so as to further isolate the operating noise of the oil pump component 100, and the outer sound-absorbing layer 600 may be made of a porous material. For example, the outer sound-absorbing layer 600 may be a nylon member, and the nylon member has a smooth inner surface and is porous in the middle, to help reflect and absorb the noise.

In some embodiments, the lower end cover 120 of the oil pump component 100 may be directly supported on the end cover 210 of the motor component 200.

In some other embodiments, the oil pump component 100 may alternatively suspend. Referring to FIG. 14, FIG. 15, and FIG. 17 to FIG. 20, the motor oil pump assembly 1000 may further include a buffering gasket 122, and the buffering gasket 122 may be sandwiched between the lower end cover 120 of the oil pump component 100 and the end cover 210 of the motor component 200. The buffering gasket 122 is disposed at a place where the oil pump component 100 is in contact with the end cover 210, and may play a role of buffering and sound-absorbing, to prevent the oil pump component 100 from directly transferring operating vibration by using a contact portion.

When the oil pump component 100 is pumping oil, torque fluctuation exists, and is fed back to a surface of the oil pump component 100 to form vibration of inherent frequency, and the buffering gasket 122 is in direct contact with the vibration, so as to eliminate collision vibration between the oil pump component 100 and the motor component 200.

On the other hand, the buffering gasket 122 may completely isolate connection between the oil pump component 100 and the periphery, to play a role of reflecting noise. Moreover, at least a part of the buffering gasket 122 may be made of a porous material. For example, at least a part of the buffering gasket 122 may be a flexible and porous structure. In this way, the buffering gasket 122 can absorb noise of some frequency.

Referring to FIG. 14, FIG. 15, FIG. 17, FIG. 19, and FIG. 20, the buffering gasket 122 may be a single-layered structure. For example, the buffering gasket 122 may be a single-layered nylon member.

Figure 18:
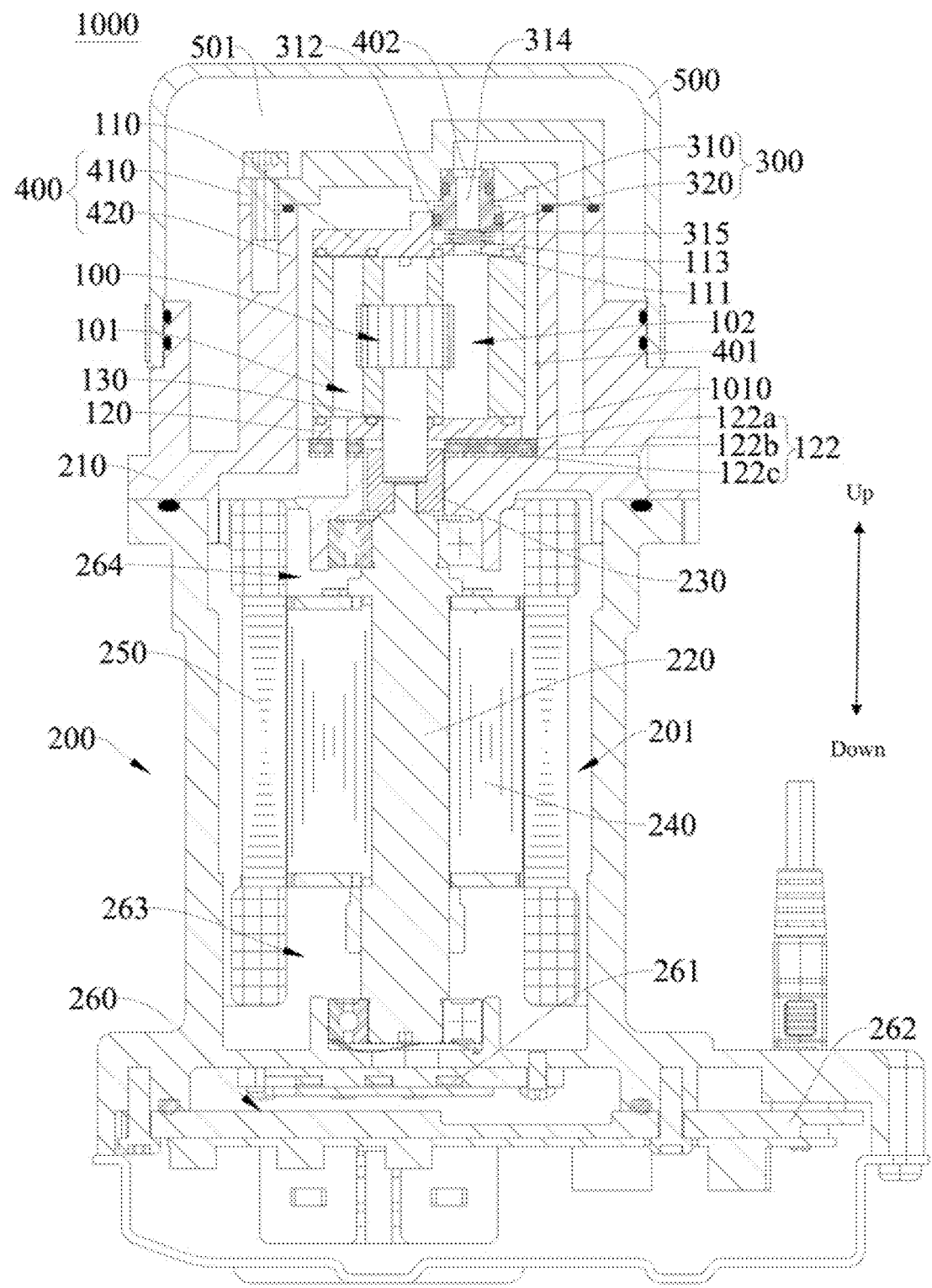
FIG. 18 is a schematic structural diagram of a motor oil pump assembly according to an eighteenth embodiment of the present disclosure.

Referring to FIG. 18, the buffering gasket 122 may include a plurality of layers, and two outer layers of the plurality of layers of the buffering gasket 122 are rigid layers, and the plurality of layers includes at least one flexible layer. The rigid outer layers facilitate connection to the lower end cover 120 of the oil pump component 100 and the end cover 210 of the motor component 200, the support strength between the oil pump component 100 and the motor component 200 is larger, and the flexible layer may play a role of sound-absorbing and vibration reduction.

Any two neighboring layers may be connected to each other in a curing manner, so as to prevent internal misplacement from occurring in the buffering gasket 122 in the operating process of the motor oil pump assembly 1000. For example, two neighboring rubber and metal layers may be connected to each other through vulcanizing. In an embodiment, the buffering gasket 122 may include an upper steel gasket 122a, an intermediate nylon gasket 122b, and a lower steel gasket 122c sequentially stacked.

In some embodiments of the present disclosure, referring to FIG. 1 to FIG. 6, the oil outlet passage 1010 of the oil pump component 100 may be disposed on the end cover 210 of the motor component 200, and the oil outlet passage 1010 is in communication with the lower end of the high-pressure cavity 102. For example, the oil outlet passage 1010 may be connected to the lower end of the high-pressure cavity 102 through a lower passage 121, and the lower passage 121 runs through the lower end cover 120.

Referring to FIG. 1 to FIG. 6, the upper end cover 110 of the oil pump component 100 may be provided with an end cover cavity 111, the end cover cavity 111 may run through the upper end cover 110, the end cover cavity 111 is in communication with the upper end of the high-pressure cavity 102, and the pre-tightening buffering component 300 may fit in with the end cover cavity 111 to isolate the high-pressure cavity 102 from the inner sound insulation cavity 401.

It may be understood that, a lower end surface of the pre-tightening buffering component 300 is in communication with the upper end of the high-pressure cavity 102 through the end cover cavity 111, a path of rippling high-pressure oil is output downward through the oil outlet passage 1010, and another path is conducted upward to the pre-tightening buffering component 300, and is reflected by the pre-tightening buffering component 300. Referring to FIG. 21, a reflected ripple and a ripple that is directly transferred to the oil outlet passage 1010 form an oil liquid ripple misplacement, and two misplaced oil liquid ripples offset each other, thereby eliminating the output ripple of the motor oil pump assembly 1000, so as to implement active noise reduction of the motor oil pump assembly 1000.

The end cover cavity 111 may be constructed as a stepped hole to form a stepped surface, the pre-tightening buffering component 300 fits in with the end cover cavity 111 to isolate the high-pressure cavity 102 from the inner sound insulation cavity 401, the pre-tightening buffering component 300 presses against the top cover 410 of the inner sound insulation enclosure 400 under the action of pressure of the high-pressure oil, the pre-tightening buffering component 300 is subjected to a counter-acting force of the inner sound insulation enclosure 400 to tightly press the oil pump component 100, and the stepped surface of the end cover cavity 111 is subjected to downward oil pressure of the high-pressure oil to tightly press the upper end cover 110, an oil pump body (such as a bearing or a gear), and the lower end cover 120.

Referring to FIG. 1 to FIG. 6, the top cover 410 may have a groove 411 opened downward, and the pre-tightening buffering component 300 may press against a top wall of the groove 411. Herein, the top wall is an upper wall of the groove 411 in an up and down direction, and during mounting, the groove 411 may play a role of positioning, and can further prevent the pre-tightening buffering component 300 from deviating in an operating process.

The pre-tightening buffering component 300 may include a piston 310 and an elastic member 320, the piston 310 fits in with the end cover cavity 111 to isolate the high-pressure cavity 102 from the inner sound insulation cavity 401, a piston seal ring 312 is disposed between the piston 310 and a circumferential wall of the end cover cavity 111, and the pre-tightening buffering component 300 formed of the piston 310 and the elastic member 320 may be sandwiched between the stepped surface of the end cover cavity 111 and the inner sound insulation enclosure 400. The piston 310 may be made of a metal nylon composite material or a metal material, and the elastic member 320 may be a spring.

Referring to FIG. 1, the elastic member 320 may be elastically sandwiched between the piston 310 and the stepped surface of the end cover cavity 111, and the piston 310 may press against the inner sound insulation enclosure 400. The elastic member 320 may apply a downward pre-tightening force to the upper end cover 110 of the oil pump component 100 by using an elastic force of the elastic member, so that the upper end cover 110 of the oil pump component 100, an oil pump body (such as a bearing or a gear), and the lower end cover 120 tightly press against each other, so as to keep sealing performance of the oil pump component 100.

An end surface of the piston 310 facing the inner sound insulation enclosure 400 has a protrusion portion 311, and the protrusion portion 311 presses against the inner sound insulation enclosure 400. The protrusion portion 311 may press against the top wall of the groove 411 on the top cover 410, so as to reduce the contact area between the piston 310 and the inner sound insulation enclosure 400, and reduce secondary noise generated between the piston 310 and the inner sound insulation enclosure 400. Moreover, the piston 310 does not form natural cold soldering with the inner sound insulation enclosure 400 due to long-term use, there may be a plurality of protrusion portions 311, and the plurality of protrusion portions 311 are evenly distributed on the end surface of the piston 310 facing the inner sound insulation enclosure 400, so that a force applied to the piston 310 is even. For example, the plurality of protrusion portions 311 may be located on a same circular ring.

Certainly, the location of the elastic member 320 and the location of the piston 310 may alternatively be exchanged. Referring to FIG. 2 to FIG. 4 and FIG. 6, the elastic member 320 may be elastically sandwiched between the piston 310 and the inner sound insulation enclosure 400, and one end of the piston 310 may press against the stepped surface of the end cover cavity 111.

The elastic member 320 may apply a downward pre-tightening force to the upper end cover 110 of the oil pump component 100 by using an elastic force of the elastic member and by using the piston 310, so that the upper end cover 110 of the oil pump component 100, an oil pump body (such as a bearing or a gear), and the lower end cover 120 tightly press against each other, so as to keep sealing performance of the oil pump component 100. Moreover, one end of the elastic member 320 may press against the top wall of the groove 411, and the groove 411 further plays a role of limiting the elastic member 320, and may prevent the elastic member 320 from deviating.

An end surface of the piston 310 facing the stepped surface may have a protrusion portion 311, and the protrusion portion 311 presses against the stepped surface, so as to reduce the contact area between the piston 310 and the stepped surface, and reduce secondary noise generated between the piston 310 and the upper end cover 110. Moreover, the piston 310 does not form natural cold soldering with the stepped surface due to long-term use, there may be a plurality of protrusion portions 311, and the plurality of protrusion portions 311 are evenly distributed on the end surface of the piston 310 facing away from the inner sound insulation enclosure 400, so that a force applied to the piston 310 is even. For example, the plurality of protrusion portions 311 may be located on a same circular ring, and each protrusion portion 311 may have a trapezoid section.

The piston 310 may eliminate some ripples through stretching/retraction of the elastic member 320. For example, the oil pressure is suddenly increased, and the piston 310 may move upward under the action of the oil pressure to compress the elastic member 320. The piston seal ring 312 tightly pressed by the piston 310 and the gap oil film between the piston 310 and the circumferential wall of the end cover cavity 111 may also eliminate some ripples, thereby reducing output ripples of the oil pump component 100, so that the output oil liquid pressure is steadier and even.

Figure 3:
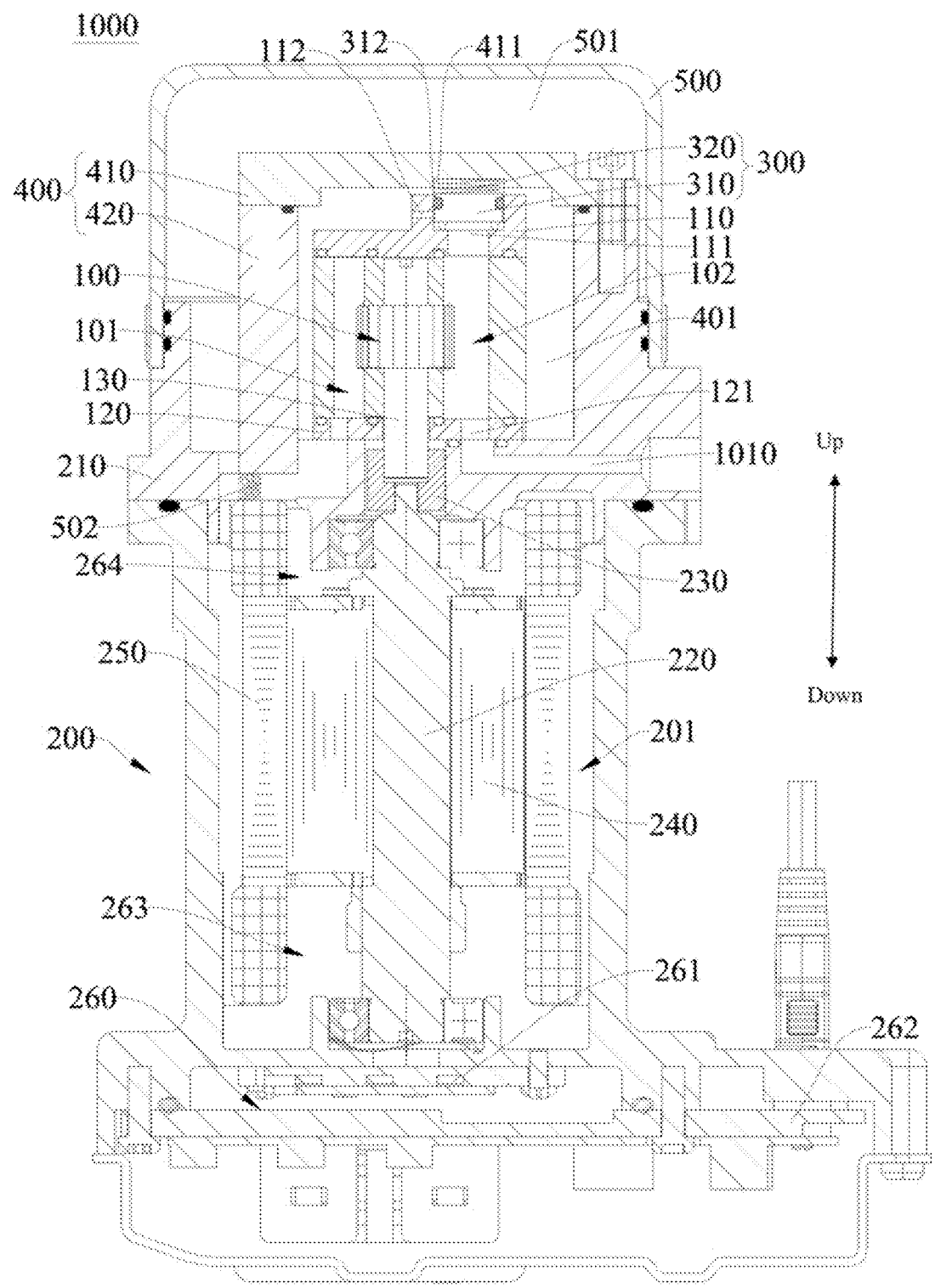
FIG. 3 is a schematic structural diagram of a motor oil pump assembly according to a third embodiment of the present disclosure.
Figure 4:
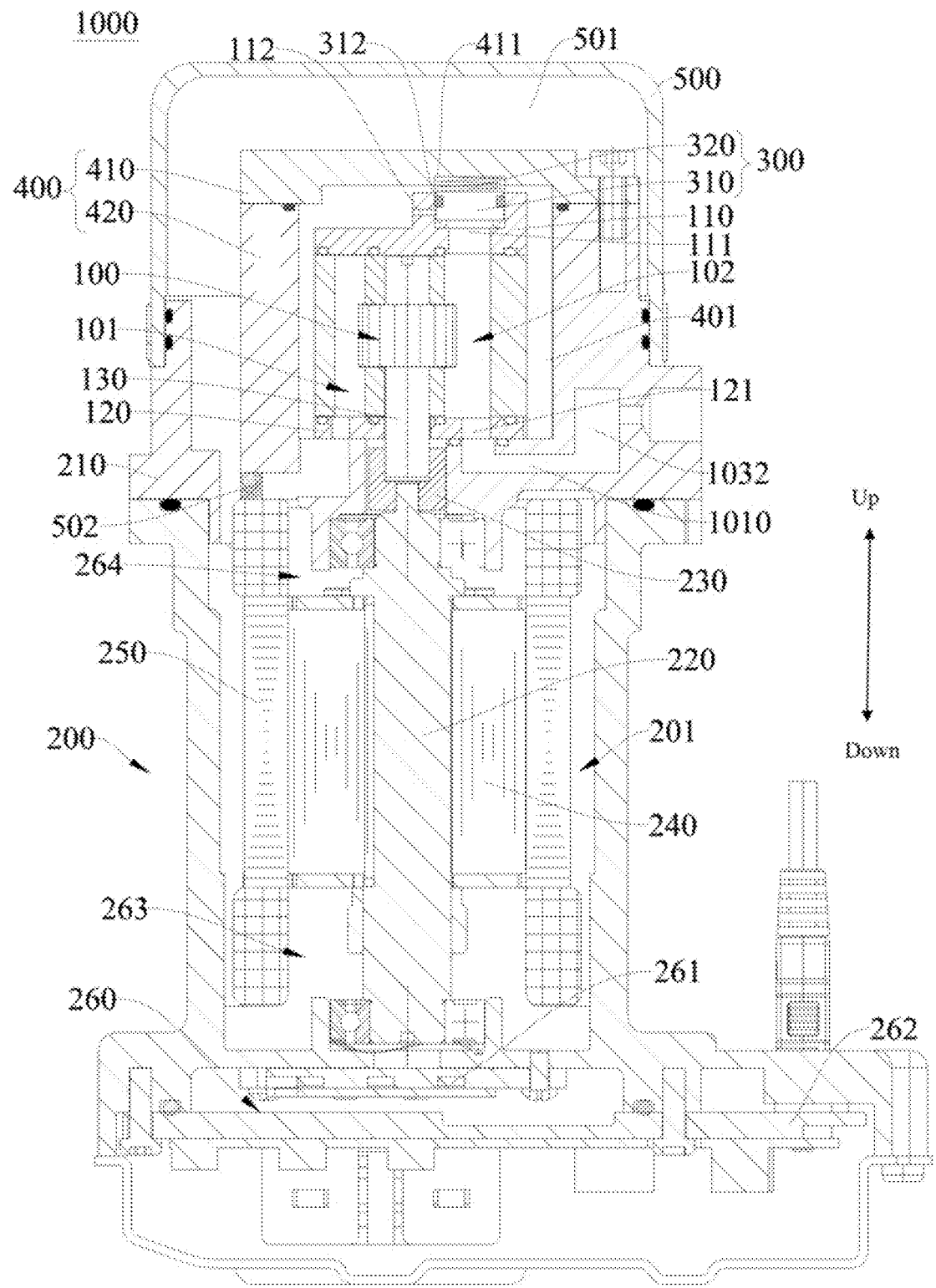
FIG. 4 is a schematic structural diagram of a motor oil pump assembly according to a fourth embodiment of the present disclosure.

Further, referring to FIG. 3 and FIG. 4, the motor oil pump assembly 1000 may further include a safety valve, and the safety valve may be set to perform pressure relief when the pressure of the high-pressure cavity 102 is greater than a predetermined pressure value. The safety valve may include a pressure relief hole 112 disposed on the circumferential wall of the end cover cavity 111, and the pressure relief hole 112 is in communication with the end cover cavity 111 and the inner sound insulation cavity 401. When the pressure of the high-pressure cavity 102 is not greater than the predetermined pressure value the piston 310 blocks the pressure relief hole 112, and when the pressure of the high-pressure cavity 102 is greater than the predetermined pressure value, the piston 310 is moved to a location for opening the pressure relief hole 112.

It may be understood that, normally, the pressure of the high-pressure cavity 102 is not greater than the predetermined pressure value, the piston 310 basically blocks the pressure relief hole 112, and the pressure relief hole 112 is sealed by the gap oil film between the piston 310 and the circumferential wall of the end cover cavity 111. When the output pressure of the oil pump component 100 is abnormal, the pressure of the high-pressure cavity 102 is greater than the predetermined pressure value, the oil pressure on the piston 310 overcomes the elastic force of the elastic member 320 to make the piston 310 move upward. When the piston 310 moves to the location for opening the pressure relief hole 112, the pressure relief hole 112 is in communication with the high-pressure cavity 102, and pressure relief may be implemented. In this case, the piston 310 is used as a valve plug, and plays a role of adjusting the output flow and the pressure of the oil pump component 100.

In some other embodiments of the present disclosure, referring to FIG. 14 to FIG. 20, at least one part of the oil outlet passage 1010 of the oil pump component 100 may be disposed in the inner sound insulation enclosure 400. For example, the oil outlet passage 1010 is in communication with the upper end of the high-pressure cavity 102 (one end away from the motor component 200).

In the embodiment in which the oil outlet passage 1010 is in communication with the upper end of the high-pressure cavity 102, referring to FIG. 17 to FIG. 20, the buffering gasket 122 may be sandwiched between the lower end cover 120 of the oil pump component 100 and the end cover 210 of the motor component 200, the buffering gasket 122 is disposed at a place where the oil pump component 100 is in contact with the end cover 210, and may play a role of buffering and sound-absorbing, to prevent the oil pump component 100 from directly transferring the operating vibration by using the contact portion. The structure of the buffering gasket 122 may be a single-layered structure shown in FIG. 17 and FIG. 20, or may be a multi-layered structure shown in FIG. 18.

Figure 14:
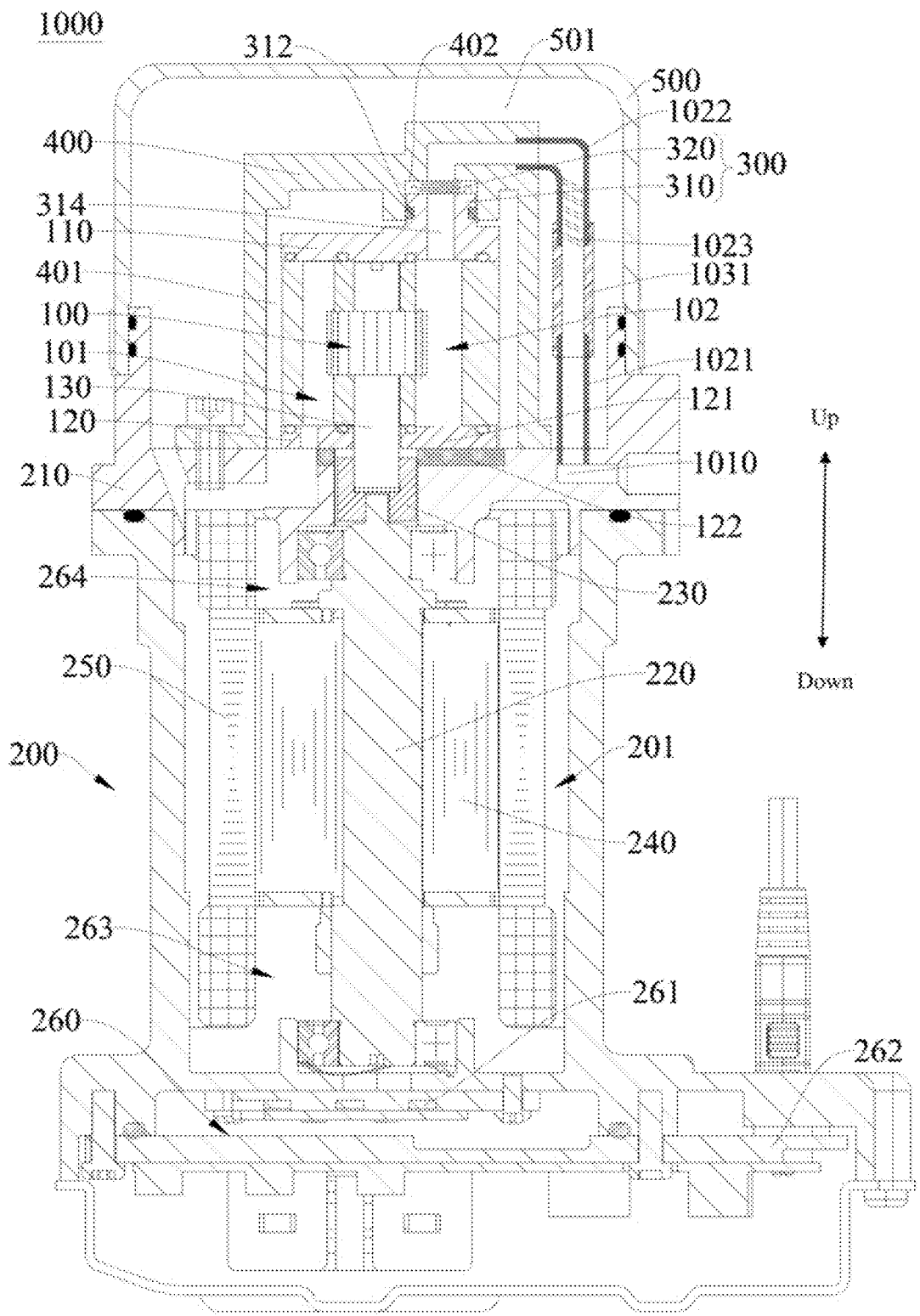
FIG. 14 is a schematic structural diagram of a motor oil pump assembly according to a fourteenth embodiment of the present disclosure.
Figure 15:
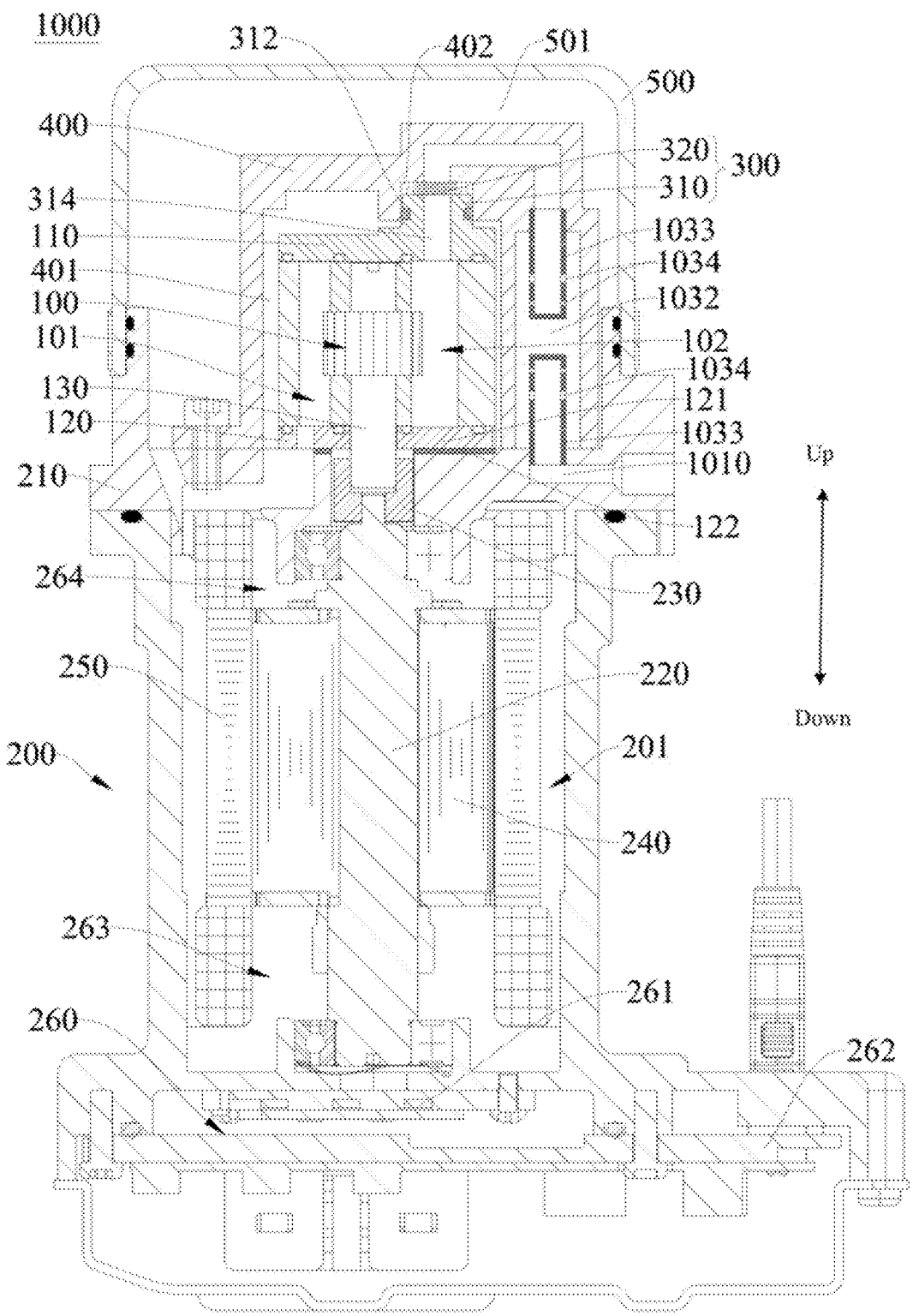
FIG. 15 is a schematic structural diagram of a motor oil pump assembly according to a fifteenth embodiment of the present disclosure.
Figure 16:
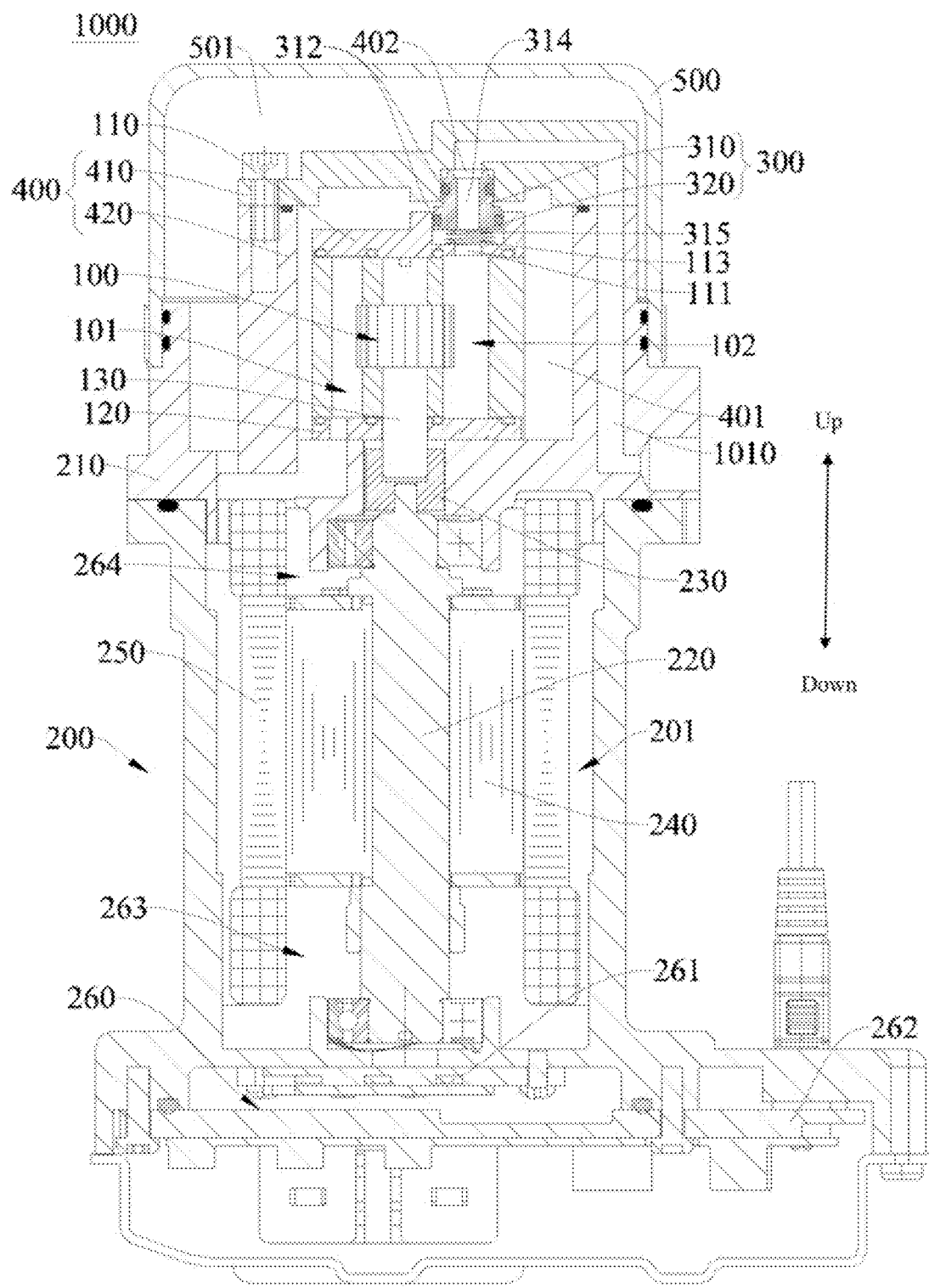
FIG. 16 is a schematic structural diagram of a motor oil pump assembly according to a sixteenth embodiment of the present disclosure.
Figure 17:
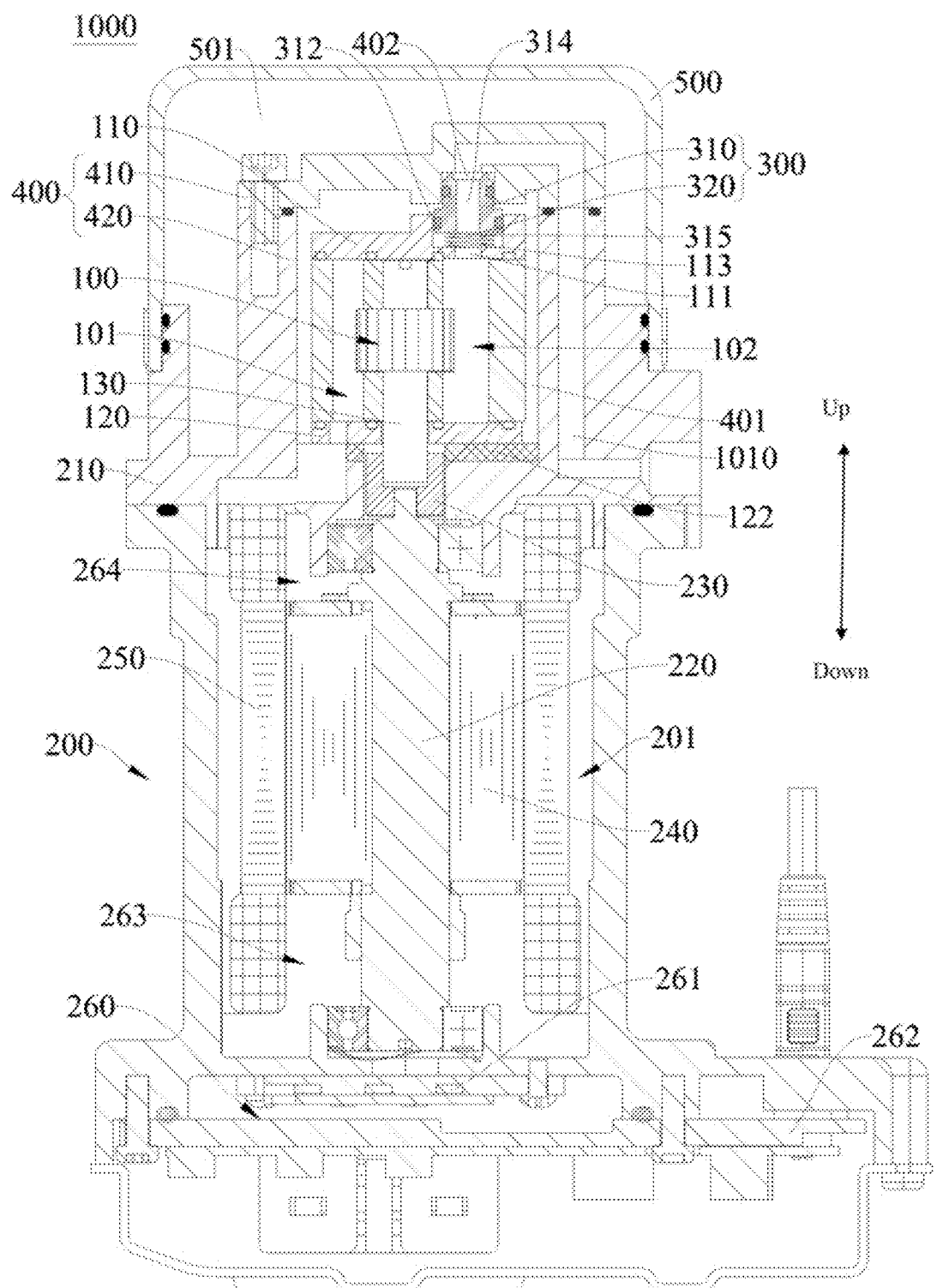
FIG. 17 is a schematic structural diagram of a motor oil pump assembly according to a seventeenth embodiment of the present disclosure.

In some embodiments, referring to FIG. 14 and FIG. 15, the inner sound insulation enclosure 400 may be provided with the oil outlet passage 1010, and the oil outlet passage 1010 is in communication with a sound insulation enclosure cavity 402. For example, the oil outlet passage 1010 may be in communication with a top wall of the sound insulation enclosure cavity 402, the piston 310 and the upper end cover 110 are integrally formed, the piston 310 is provided with a piston hole 314 running through the piston 310, the piston hole 314 runs through the upper end cover 110, and the piston hole 314 is connected to both the high-pressure cavity 102 and the sound insulation enclosure cavity 402. In this way, a flow direction of high-pressure oil pumped by the oil pump component 100 is: the high-pressure cavity 102—the piston hole 314—the oil outlet passage 1010.

An end surface of the piston 310 facing the sound insulation enclosure cavity 402 has a protrusion portion 311, and the protrusion portion 311 presses against the top wall of the sound insulation enclosure cavity 402.

It may be understood that, by disposing the protrusion portion 311, the contact area between an end surface of the piston 310 and the inner sound insulation enclosure 400 may be reduced, and secondary noise generated between the piston 310 and the inner sound insulation enclosure 400 may be reduced. Moreover, the piston 310 does not form natural cold soldering with the inner sound insulation enclosure 400 due to long-term use, there may be a plurality of protrusion portions 311, and the plurality of protrusion portions 311 are evenly distributed on the end surface of the piston 310 facing the inner sound insulation enclosure 400, so that a force applied to the piston 310 is even. For example, the plurality of protrusion portions 311 may be located on a same circular ring, and each protrusion portion 311 may have a trapezoid section.

In some other embodiments, referring to FIG. 16 to FIG. 20, the upper end cover 110 of the oil pump component 100 has the end cover cavity 111, the end cover cavity 111 runs through the upper end cover 110, and the end cover cavity 111 is in communication with the high-pressure cavity 102 of the oil pump component 100. The inner sound insulation enclosure 400 is provided with the sound insulation enclosure cavity 402, the pre-tightening buffering component 300 includes the piston 310 and the elastic member 320, an upper segment of the piston 310 fits in with the sound insulation enclosure cavity 402, a lower segment of the piston 310 fits in with the end cover cavity 111, a piston seal ring 312 is disposed between the upper segment of the piston 310 and a circumferential wall of the sound insulation enclosure cavity 402, and another piston seal ring 312 is disposed between the lower segment of the piston 310 and the circumferential wall of the end cover cavity 111, so as to isolate the high-pressure cavity 102 of the oil pump component 100 from the inner sound insulation cavity 401. The elastic member 320 is used to provide a pre-tightening force. The piston 310 may be made of a metal nylon composite material or a metal material.

It may be understood that, the piston 310 may eliminate some ripples through stretching/retraction of the elastic member 320. The piston seal ring 312 tightly pressed by the piston 310, the gap oil film between the piston 310 and the circumferential wall of the end cover cavity 111, and the gap oil film between the piston 310 and the circumferential wall of the sound insulation enclosure cavity 402 may also eliminate some ripples, thereby reducing output ripples of the oil pump component 100, so that the output oil liquid pressure is more steady and even.

The end cover cavity 111 may be constructed as a stepped hole to form a stepped surface, the elastic member 320 may be elastically sandwiched between the piston 310 and the stepped surface, the piston 310 presses against the top wall of the sound insulation enclosure cavity 402, the diameter of the upper segment of the piston 310 is less than the diameter of the lower segment of the piston 310, and the stepped surface between the upper segment of the piston 310 and the lower segment of the piston 310 is spaced apart from the inner sound insulation enclosure 400 and is located in the inner sound insulation cavity 401, so as to prevent the piston 310 from colliding with the inner sound insulation enclosure 400.

One end of the piston 310 pressing against the elastic member 320 is provided with an upper guiding protrusion 315. To be specific, one end of the piston 310 is provided with an upper guiding protrusion 315, and the end presses against the elastic member 320. A lower guiding protrusion 113 corresponding to the upper guiding protrusion 315 is disposed on the stepped surface of the end cover cavity 111. The elastic member may be a spring, and be sleeved on the upper guiding protrusion 315 and the lower guiding protrusion 113. There may be a plurality of upper guiding protrusions 315, and the plurality of upper guiding protrusions 315 is evenly distributed on an end surface of the piston 310 facing the end cover cavity 111. For example, the plurality of upper guiding protrusions 315 may be located on a same circular ring. There may be a plurality of lower guiding protrusions 113, and the plurality of lower guiding protrusions 113 is evenly distributed on the stepped surface of the end cover cavity 111.

The piston 310 presses against the inner sound insulation enclosure 400 under the joint action of the pressure of the high-pressure oil output by the high-pressure cavity 102 and the elastic force of the elastic member 320, the counteracting force of the inner sound insulation enclosure 400 makes the elastic member 320 tightly press the oil pump component 100, and the stepped surface of the end cover cavity 111 is subjected to downward oil pressure of the high-pressure oil to tightly press the upper end cover 110, so that the upper end cover 110 of the oil pump component 100, an oil pump body (such as a bearing or a gear), and the lower end cover 120 tightly press against each other, so as to keep sealing performance of the oil pump component 100.

In some still other embodiments of the present disclosure, referring to FIG. 7 to FIG. 13, the motor oil pump assembly 1000 has the oil outlet passage 1010 and an oil outlet branch 1020, where the oil outlet passage 1010 is in communication with the lower end of the high-pressure cavity 102. For example, the oil outlet passage 1010 may be connected to the lower end of the high-pressure cavity 102 through a lower passage of 121 running through the lower end cover 120, and the oil outlet branch 1020 is connected to the oil outlet passage 1010, so as to guide the high-pressure oil to one end of the pre-tightening buffering component 300 away from the upper end cover 110. The high-pressure oil is output downward through the oil outlet passage 1010, and branched at the oil outlet branch 1020 to be conducted to the pre-tightening buffering component 300, and the pre-tightening buffering component 300 tightly presses the upper end cover 110 downward under the action of the oil pressure, so as to provide some pre-tightening force.

The sound insulation enclosure cavity 402 may be defined for the inner sound insulation enclosure 400, the sound insulation enclosure cavity 402 may be defined on the top cover 410 of the inner sound insulation enclosure 400, the pre-tightening buffering component 300 may include the piston 310 and the elastic member 320, the piston 310 fits in with the sound insulation enclosure cavity 402, the piston 310 presses against the upper end cover 110 of the oil pump component 100, and the piston seal ring 312 may be sandwiched between the piston 310 and a circumferential wall of the sound insulation enclosure cavity 402. The elastic member 320 is elastically sandwiched between the top wall of the sound insulation enclosure cavity 402 and the piston 310, the elastic member 320 is used to provide a pre-tightening force for tightly pressing the upper end cover 110, and the elastic member 320 may be a spring. The sound insulation enclosure cavity 402 is in communication with the high-pressure cavity 102 of the oil pump component 100, the piston 310 tightly presses the upper end cover 110 downward under the action of the oil pressure, and the elastic force of the elastic member 320 and the oil pressure of the high-pressure oil guided out from the oil outlet branch 1020 jointly act on the upper end cover 110, so that the upper end cover 110 of the oil pump component 100, an oil pump body (such as a bearing or a gear), and the lower end cover 120 tightly press against each other, so as to keep sealing performance of the oil pump component 100.

The oil outlet passage 1010 may be disposed on the end cover 210 of the motor component 200, and the oil outlet passage 1010 may be in communication with the lower end of the high-pressure cavity 102. For example, the oil outlet passage 1010 may be connected to the lower end of the high-pressure cavity 102 through a lower passage of 121 running through the lower end cover 120. The oil outlet branch 1020 is in communication with the oil outlet passage 1010, the oil outlet branch 1020 is in communication with the sound insulation enclosure cavity 402, and the oil outlet branch 1020 may run through until the top wall of the sound insulation enclosure cavity 402. Referring to FIG. 7 to FIG. 13, the oil outlet branch 1020 may be disposed on the inner sound insulation enclosure 400.

A path of rippling high-pressure oil is directly output through the oil outlet passage 1010, and another path is conducted to the piston 310 through the oil outlet branch 1020, and reversely reflected. Referring to FIG. 21, a reflected ripple and a ripple that is directly transferred to the oil outlet passage 1010 form an oil liquid ripple misplacement, and two misplaced oil liquid ripples offset each other, thereby eliminating the output ripple of the motor oil pump assembly 1000, so as to implement active noise reduction of the motor oil pump assembly 1000.

The piston 310 may eliminate some ripples through stretching/retraction of the elastic member 320. For example, the oil pressure is suddenly increased, and the piston 310 may move downward under the action of the oil pressure. The piston seal ring 312 tightly pressed by the piston 310 and the gap oil film between the piston 310 and the circumferential wall of the end cover cavity 111 may also eliminate some ripples, thereby reducing output ripples of the oil pump component 100, so that the output oil liquid pressure is steadier and even.

Figure 7:
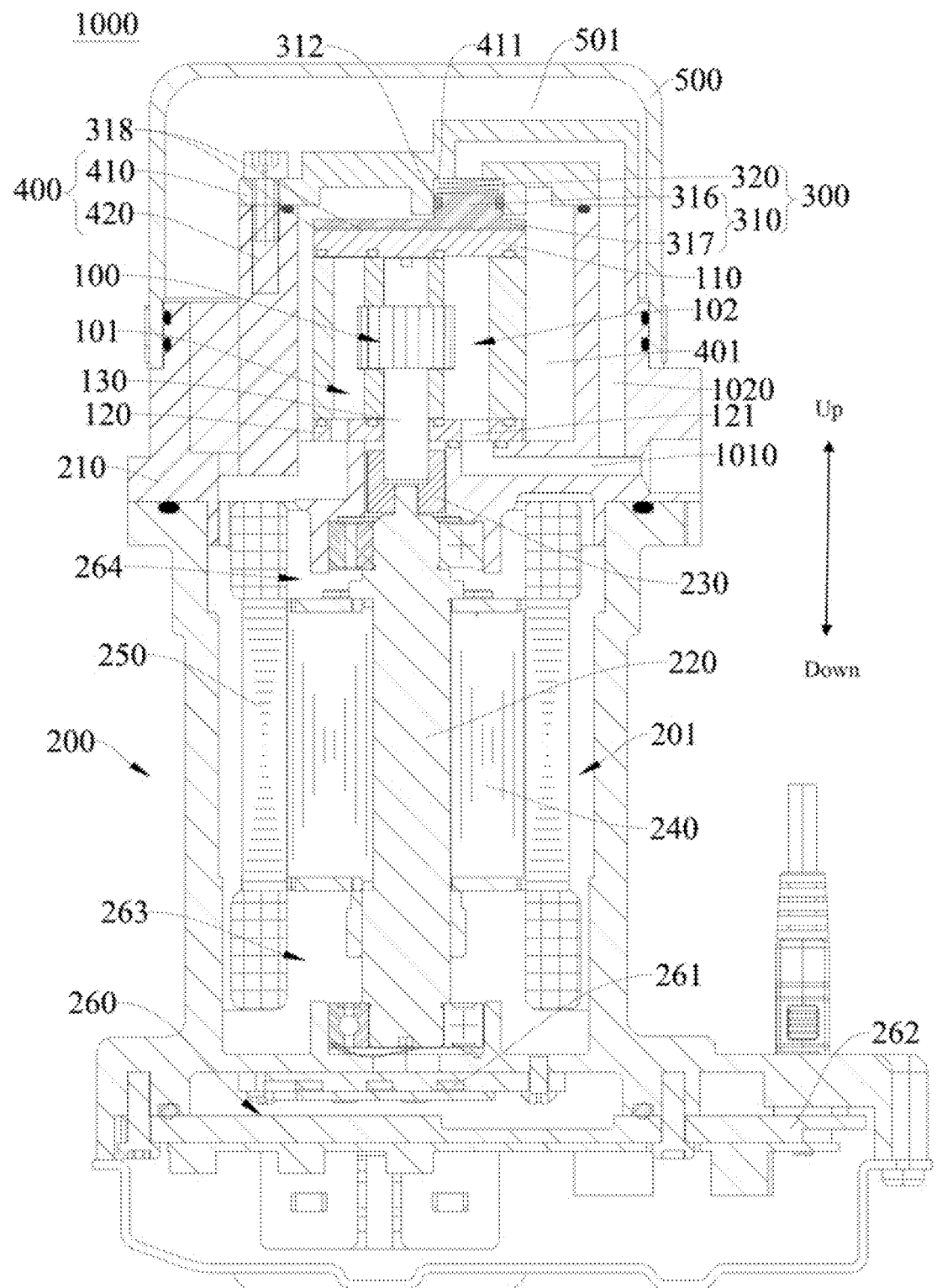
FIG. 7 is a schematic structural diagram of a motor oil pump assembly according to a seventh embodiment of the present disclosure.
Figure 8:
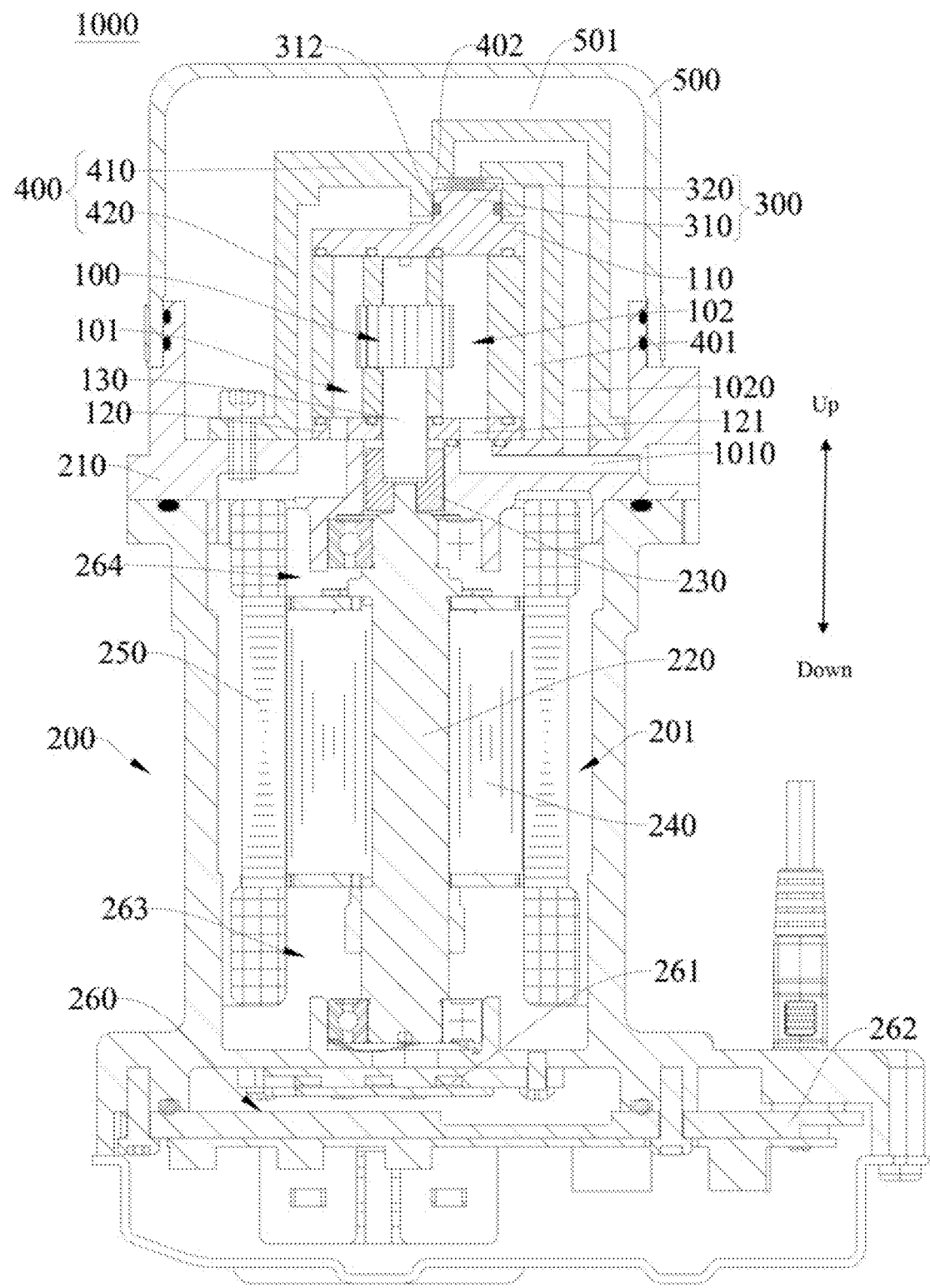
FIG. 8 is a schematic structural diagram of a motor oil pump assembly according to an eighth embodiment of the present disclosure.
Figure 9:
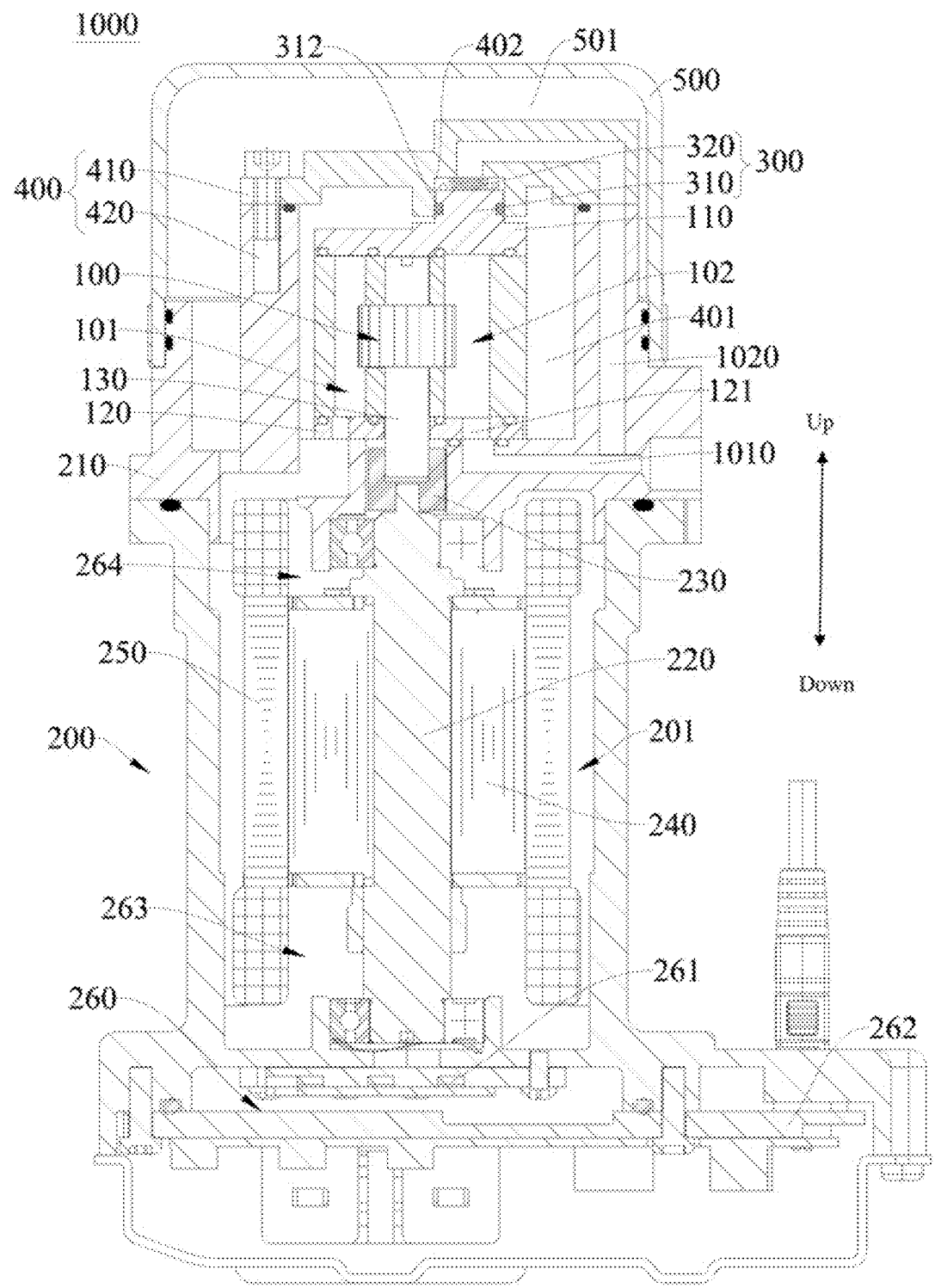
FIG. 9 is a schematic structural diagram of a motor oil pump assembly according to a ninth embodiment of the present disclosure.

There is a plurality of structure forms of the piston 310. Referring to FIG. 7, the piston 310 and the upper end cover 110 may be separated, and the piston 310 may be made of a metal nylon composite material or a metal material.

The piston 310 may include a piston segment 316 and a pressing segment 317 that are connected, and the piston segment 316 and the pressing segment 317 may be integrally formed. The piston segment 316 fits in with the sound insulation enclosure cavity 402, and the piston seal ring 312 may be sandwiched between the piston segment 316 and a circumferential wall of the sound insulation enclosure cavity 402. The pressing segment 317 presses against the upper end cover 110, and the cross-sectional area of the pressing segment 317 may be greater than the cross-sectional area of the piston segment 316. In this way, the pressing segment 317 may apply the elastic force of the elastic member 320 and the pressure of the oil liquid that are borne by the piston segment 316 to areas of the upper end cover 110 more evenly, and the mounting sealing performance of the oil pump component 100 is better. The projection of the pressing segment 317 on the upper end cover 110 may completely coincide with the upper end cover 110.

An end surface of the pressing segment 317 facing the upper end cover 110 may have a pressing boss 318, and the pressing boss 318 presses against the upper end cover 110. In this way, the contact area between the piston 310 and the upper end cover 110 may be reduced, and secondary noise generated between the piston 310 and the upper end cover 110 may be reduced. Moreover, the piston 310 does not form natural cold soldering with the upper end cover 110 due to long-term use. There may be a plurality of pressing bosses 318, and the plurality of pressing bosses 318 is spaced apart from each other, so that a force applied to the piston 310 is even. For example, the plurality of pressing bosses 318 may be located on a plurality of concentric circular rings, and the pressing boss 318 may have a trapezoid section.

Referring to FIG. 8 to FIG. 13, the piston 310 and the upper end cover 110 of the oil pump component 100 are integrally formed, and the piston 310 may be made of a metal nylon composite material or a metal material. In this way, the structure and the mounting process of the motor oil pump assembly 1000 are simpler.

Certainly, there may be a plurality of structure forms of the pre-tightening buffering component 300, and the foregoing structure form of the piston 310 and the elastic member 320 is only an embodiment. In some other embodiments, the pre-tightening buffering component 300 may be a hydraulic valve, the upper end cover 110 and/or the inner sound insulation enclosure 400 forms a valve base of the hydraulic valve, the valve base has a valve cavity, and a valve plug is disposed in the valve cavity.

Figure 5:
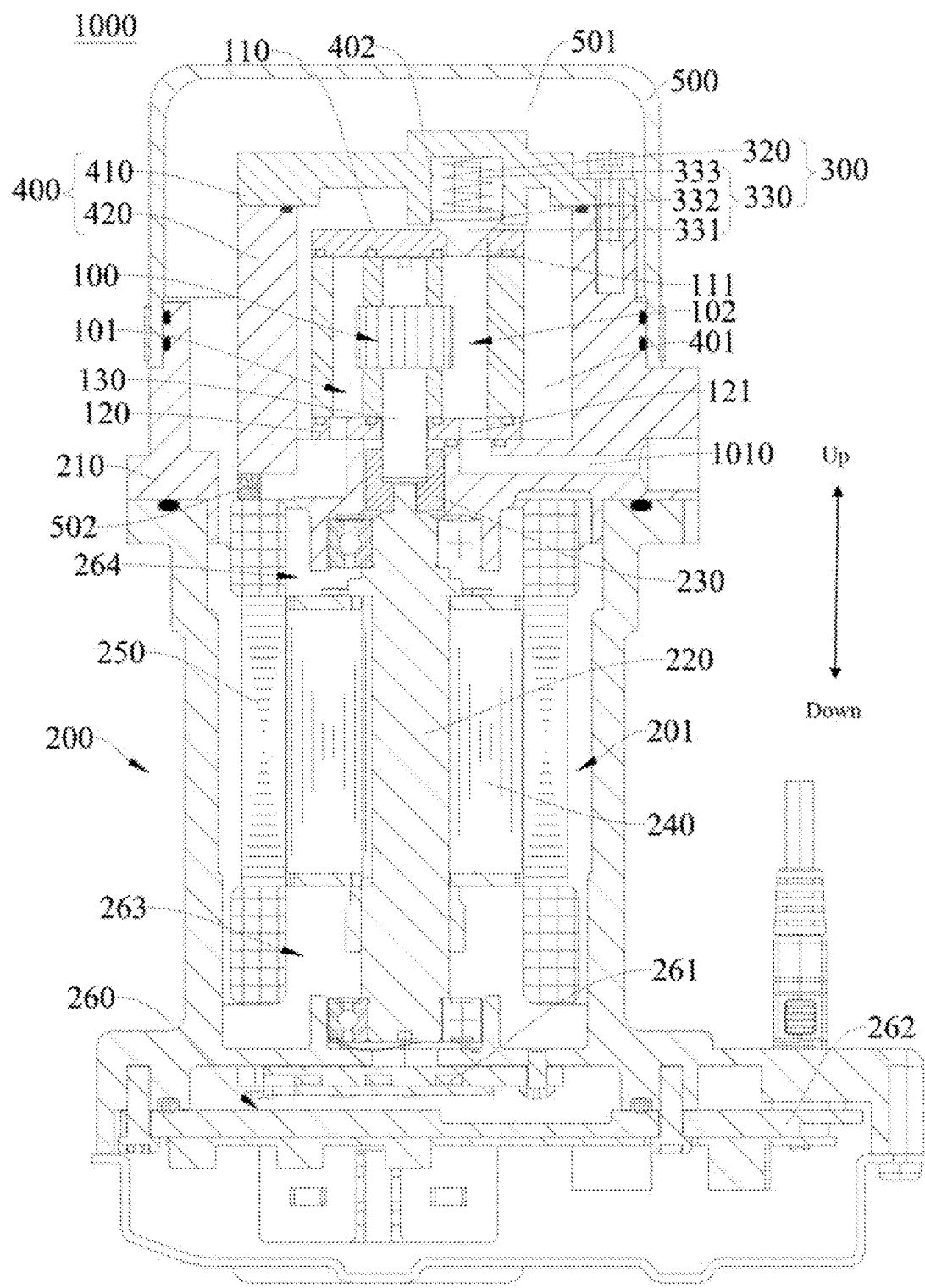
FIG. 5 is a schematic structural diagram of a motor oil pump assembly according to a fifth embodiment of the present disclosure.

In an embodiment of the disclosure, referring to FIG. 5, the motor oil pump assembly 1000 includes a motor component 200, an oil pump component 100, an inner sound insulation enclosure 400, and a pre-tightening buffering component 300.

The oil pump component 100 is supported on the end cover 210 of the motor component 200, the upper end cover 110 of the oil pump component 100 has the end cover cavity 111, the end cover cavity 111 runs through the upper end cover 110, and the end cover cavity 111 is in communication with the high-pressure cavity 102 of the oil pump component 100. The inner sound insulation enclosure 400 encloses the oil pump component 100, and the inner sound insulation enclosure 400 and the oil pump component 100 define the inner sound insulation cavity 401. The inner sound insulation cavity 401 is filled with low-pressure oil, and the inner sound insulation cavity 401 is in communication with the low-pressure cavity 101 of the oil pump component 100.

The pre-tightening buffering component 300 includes a valve plug 330 and an elastic member 320, and the elastic member 320 is elastically pressed between the valve plug 330 and the inner sound insulation enclosure 400, so that the valve plug 330 blocks the end cover cavity 111. The elastic member 320 may be a spring.

The valve plug 330 blocks the end cover cavity 111 under the action of the elastic force of the elastic member 320, so that the high-pressure end cover cavity 111 and the low-pressure inner sound insulation cavity 401 are separated. Moreover, the elastic member 320 further provides a pre-tightening force of the oil pump component 100, and the pressure applied by the valve plug 330 to the upper end cover 110 of the oil pump component 100, so that the upper end cover 110 of the oil pump component 100, an oil pump body (such as a bearing or a gear), and the lower end cover 120 tightly press against each other, so as to keep sealing performance of the oil pump component 100. Moreover, large-torque bolt locking does not need to be performed on the oil pump component 100, and the pre-tightening force provided by the pre-tightening buffering component 300 only needs to ensure that the oil pump component 100 can be mounted. In this way, the operating friction force of the oil pump component 100 may be reduced, to improve the operating energy efficiency of the oil pump component 100, and the mechanical efficiency of the oil pump component 100 is high.

The valve plug 330 may eliminate some ripples through stretching/retraction of the elastic member 320. Moreover, the rippling high-pressure oil output by the oil pump component 100 is divided into two paths, one path is output downward through the oil outlet passage 1010, and the other path is conducted upward to the valve plug 330, and is reflected by the valve plug 330. Referring to FIG. 21, a reflected ripple and a ripple that is directly transferred to the oil outlet passage 1010 form an oil liquid ripple misplacement, and two misplaced oil liquid ripples offset each other, thereby eliminating the output ripple of the motor oil pump assembly 1000, so as to implement active noise reduction of the motor oil pump assembly 1000. Moreover, the pressure of the oil liquid output by the motor oil pump assembly 1000 is steadier and even.

In this embodiment, the valve plug 330 blocks the upper end of the high-pressure cavity 102, and the oil outlet passage 1010 may be in communication with the high-pressure cavity 102 through the lower passage 121 running through the lower end cover 120, thereby outputting the high-pressure oil. This structure form of oil path is described above in detail. Details are not described herein again.

The valve plug 330 may include a seal segment 331, a guiding segment 332, and a limiting segment 333 that are sequentially connected. The inner sound insulation enclosure 400 has the sound insulation enclosure cavity 402 opened toward the upper end cover 110, the guiding segment 332 fits in with an inner circumferential wall of the sound insulation enclosure cavity 402, and a gap oil film between the guiding segment 332 and the inner circumferential wall of the sound insulation enclosure cavity 402 may also eliminate some ripples. The elastic member 320 is sleeved on the limiting segment 333, the elastic member 320 is pressed between the top wall of the sound insulation enclosure cavity 402 and the end surface of the guiding segment 332, and the limiting segment 333 may play a role of guiding and limiting.

Referring to FIG. 5, the valve plug 330 may have a tapered seal surface, and the tapered seal surface may be disposed on the seal segment 331. In other words, the valve plug 330 may be a tapered valve, and the upper end cover 110 may have a tapered seal surface corresponding to the tapered seal surface of the valve plug 330. In this way, the valve plug 330 has a better effect of blocking the end cover cavity 111.

In some embodiments of the present disclosure, an energy absorption portion may be disposed on the oil outlet passage 1010 of the oil pump component 100, and the energy absorption portion may be of a plurality of structures. For example, the energy absorption portion may be an energy storage cavity 1032, a gas storage tank, or a damping hole.

In an embodiment, referring to FIG. 4, the energy absorption portion may be an energy storage cavity 1032, the energy storage cavity 1032 may be disposed on the oil outlet passage 1010, the section area of the energy storage cavity 1032 may be greater than the section area of another part of the oil outlet passage 1010, and the energy storage cavity 1032 may play a role of eliminating the oil liquid ripple and performing fluid noise reduction.

The energy storage cavity 1032 may be disposed on a bending position of the oil outlet passage 1010. For example, in FIG. 4, the energy storage cavity 1032 may have a round section. A lower end of a circumferential wall of the energy storage cavity 1032 may be in communication with a lower end of the high-pressure cavity 102 of the oil pump component 100, and a middle-upper end of the circumferential wall of the energy storage cavity 1032 may be in communication with an oil outlet of the motor oil pump assembly 1000. In this way, the energy storage cavity has a better effect of buffering the ripple and a better effect of eliminating the noise.

Figure 10:
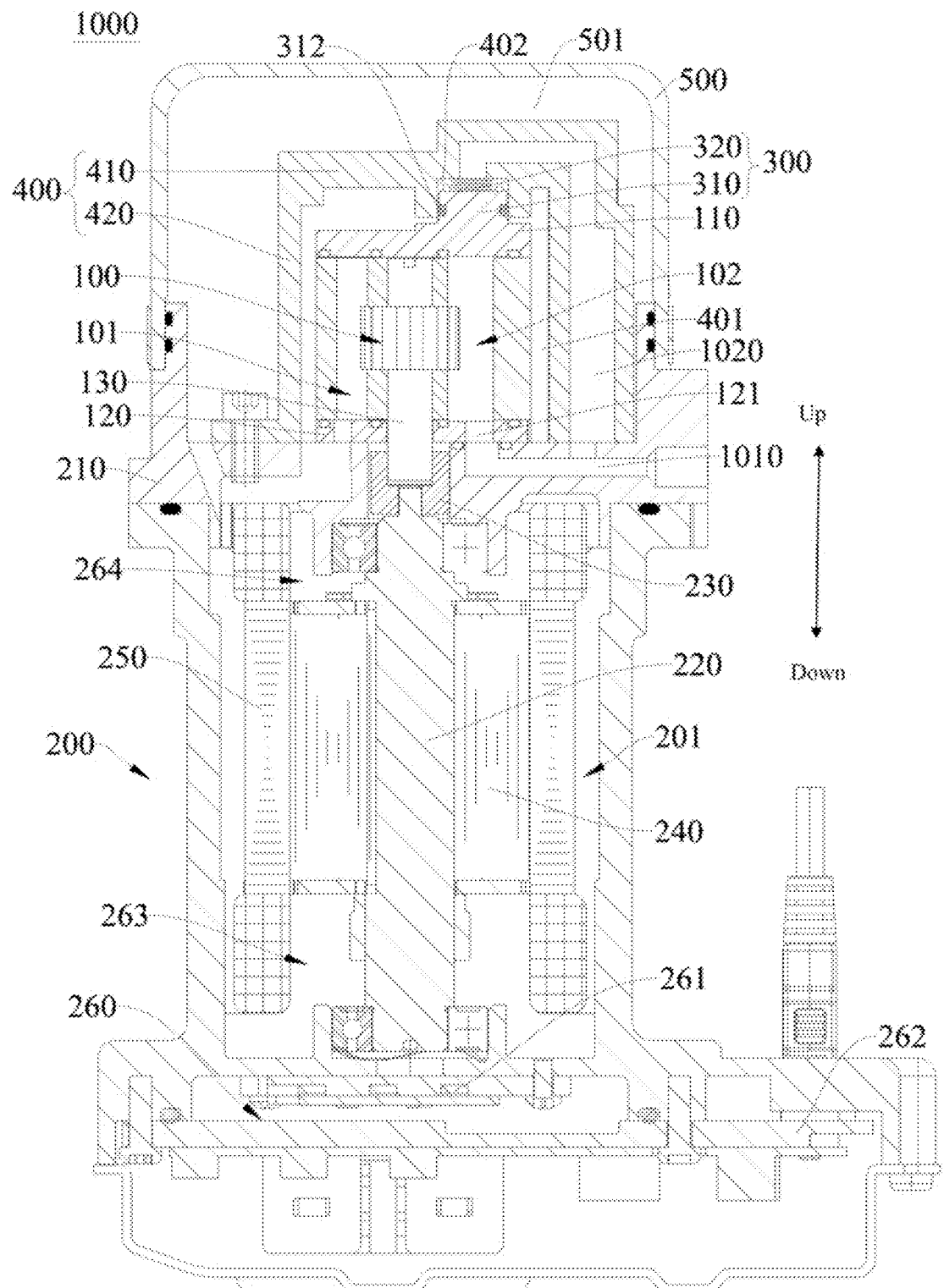
FIG. 10 is a schematic structural diagram of a motor oil pump assembly according to a tenth embodiment of the present disclosure.
Figure 11:
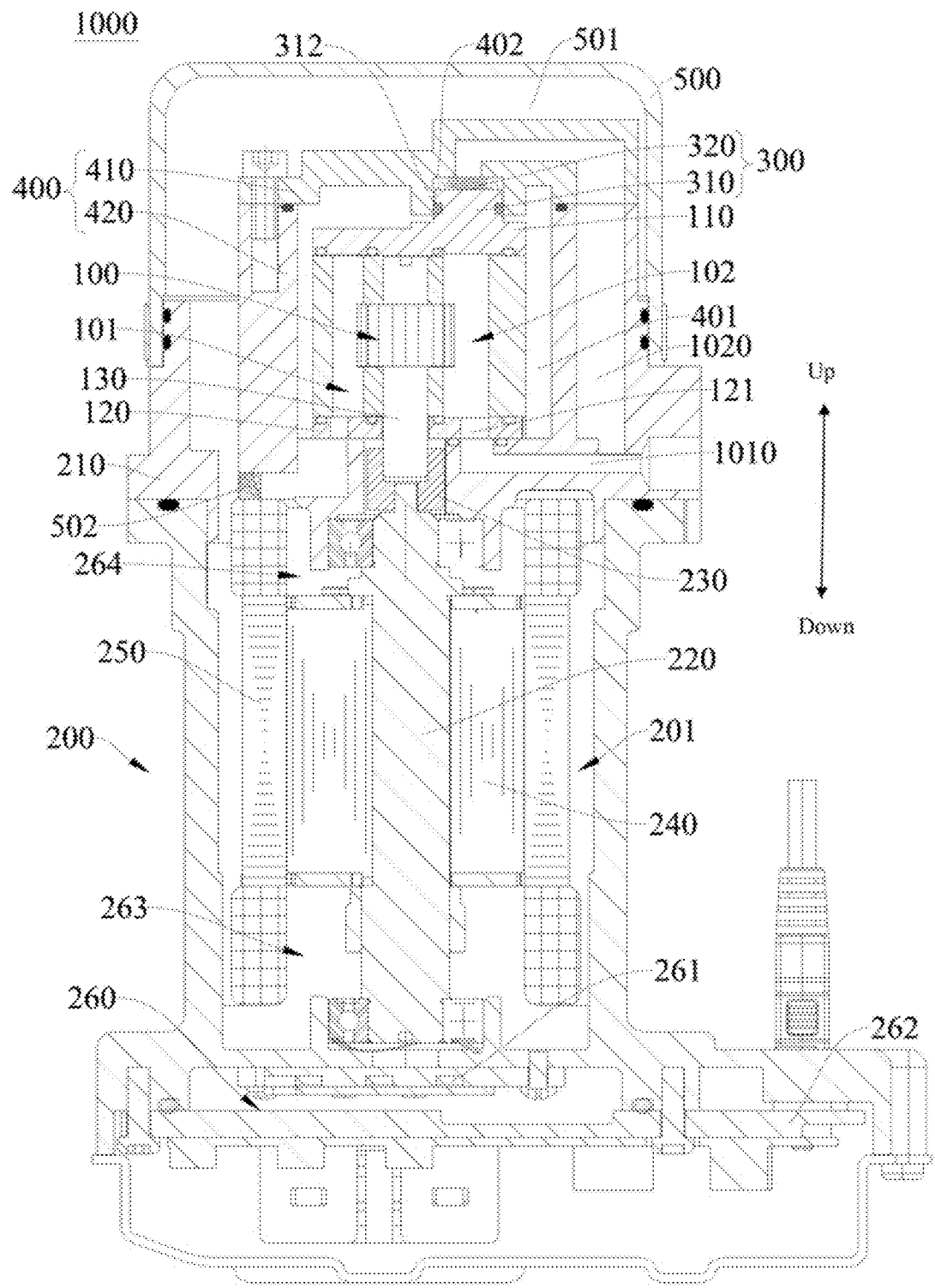
FIG. 11 is a schematic structural diagram of a motor oil pump assembly according to an eleventh embodiment of the present disclosure.
Figure 12:
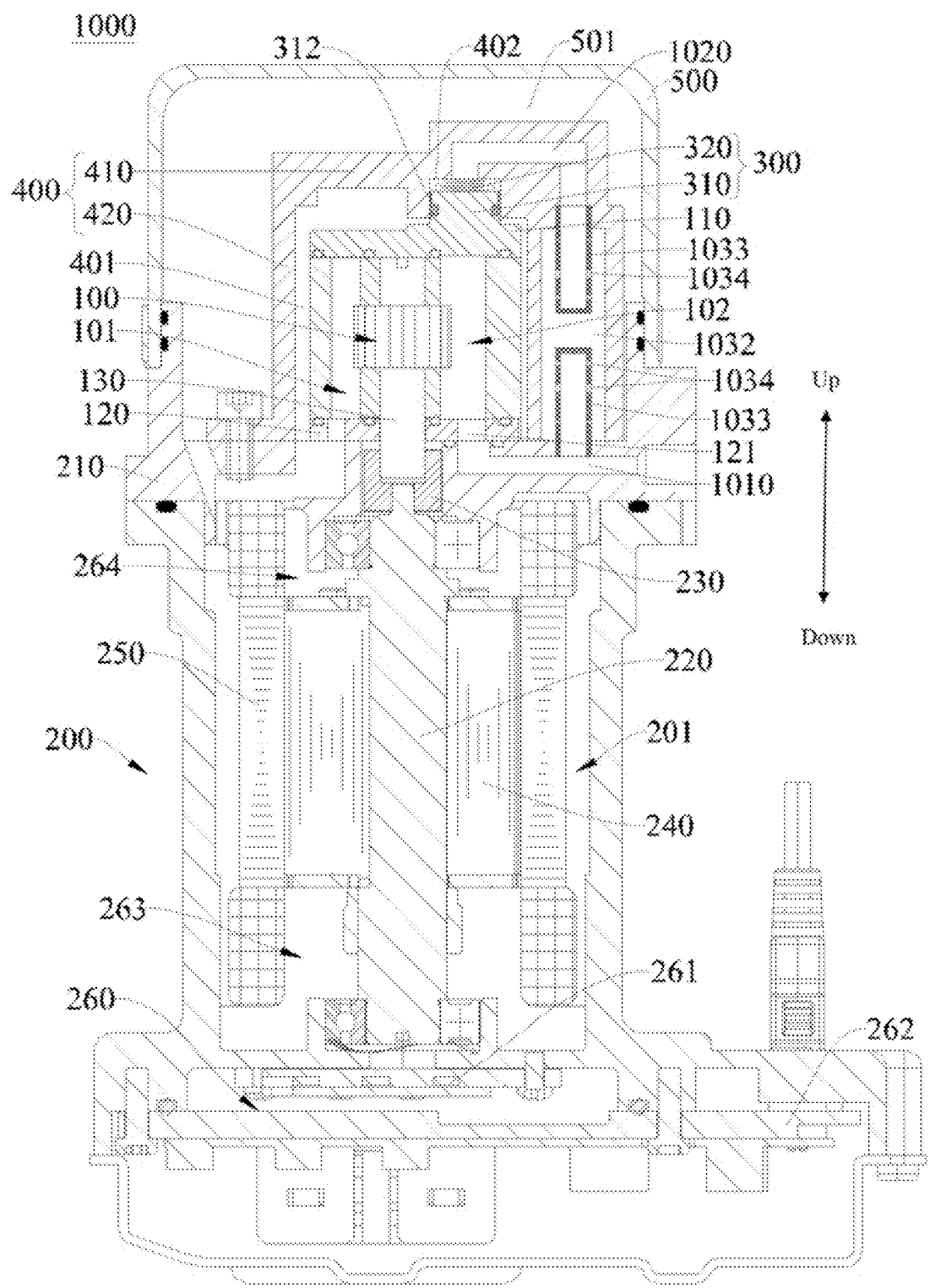
FIG. 12 is a schematic structural diagram of a motor oil pump assembly according to a twelfth embodiment of the present disclosure.

In another embodiment, referring to FIG. 10 to FIG. 12, the energy storage cavity 1032 may be disposed on the high-pressure oil path between the sound insulation enclosure cavity 402 and the high-pressure cavity 102. To be specific, the energy storage cavity 1032 may be located on the oil outlet branch 1020, and the cross-sectional area of the energy storage cavity 1032 may be greater than the cross-sectional area of another part of the oil outlet branch 1020.

The energy storage cavity 1032 may have a round cross section, and the energy storage cavity 1032 may be disposed in the side skirt 420 of the sound insulation enclosure. Referring to FIG. 11, the energy storage cavity 1032 may extend to the top cover 410 from one end of the side skirt 420 away from the top cover 410. In this way, the volume of the energy storage cavity 1032 is larger, the energy storage cavity 1032 may play a role of eliminating the oil liquid ripple and performing fluid noise reduction, and noise of various frequencies may be eliminated by designing the size of the energy storage cavity 1032.

In still another embodiment, referring to FIG. 12 and FIG. 15, the high-pressure oil path of the oil pump component 100 is provided with the energy storage cavity 1032, at least one end of the energy storage cavity 1032 is connected to a noise reduction tube 1033, and the noise reduction tube 1033 may be made of a metal material.

Each of two ends of the energy storage cavity 1032 is provided with a noise reduction tube 1033, the noise reduction tube 1033 may be constructed as a tube shape having one end opened, where an opened end of one noise reduction tube 1033 is inserted into the end cover 210 of the motor component 200, and the opened end of the noise reduction tube 1033 is in communication with the oil outlet passage 1010; and an opened end of the other noise reduction tube 1033 is inserted into the inner sound insulation enclosure 400, and the opened end of the noise reduction tube is in communication with the oil outlet branch 1020.

The noise reduction tube 1033 is provided with a through-hole 1034, the noise reduction tube 1033 may be provided with a plurality of through-holes 1034, and the plurality of through-holes 1034 is spaced apart from each other and disposed on the circumferential wall of the noise reduction tube 1033, where at least two through-holes 1034 having different pore sizes exist on a same noise reduction tube 1033, and the two through-holes 1034 having different pore sizes may be spaced apart along an axial direction of the noise reduction tube 1033.

It may be understood that, fitting-in between the noise reduction tube 1033 and the energy storage cavity 1032 may play a role of eliminating the oil liquid ripple and the fluid noise, and the through-holes 1034 on the noise reduction tube 1033 enable a plurality of oil branching paths having different opening diameters to be formed between the noise reduction tube 1033 and the energy storage cavity 1032, so as to play a role of turbulent flow, and the through-holes 1034 having different pore sizes may eliminate noise of different frequencies.

Referring to FIG. 12, the high-pressure oil path may include the oil outlet passage 1010 and the oil outlet branch 1020, and the oil outlet passage 1010 is in communication with the high-pressure cavity 102. For example, the oil outlet passage 1010 may be disposed on the end cover 210 of the motor component 200, the oil outlet passage 1010 is connected to the lower end of the high-pressure cavity 102 through the lower passage 121 running through the lower end cover 120, the oil outlet branch 1020 is in communication with the oil outlet passage 1010, and the oil outlet branch 1020 is in communication with the sound insulation enclosure cavity 402. The oil outlet branch 1020 may run through until the top wall of the sound insulation enclosure cavity 402, and the energy storage cavity 1032 may be located on the oil outlet branch 1020. In this embodiment, the energy storage cavity 1032 and the noise reduction tube 1033 are a part of the oil outlet branch 1020.

Referring to FIG. 15, the high-pressure oil path includes the oil outlet passage 1010, the oil outlet passage 1010 is in communication with the sound insulation enclosure cavity 402, the piston 310 is provided with the piston hole 314 running through the piston 310, the piston hole 314 is connected to each of the high-pressure cavity 102 and the sound insulation enclosure cavity 402, and the energy storage cavity 1032 is disposed on the oil outlet passage 1010. In this embodiment, the energy storage cavity 1032 and the noise reduction tube 1033 are used as a part of the oil outlet passage 1010. Moreover, in this embodiment, the high-pressure oil is not output through the lower end cover 120, and the buffering gasket 122 described in the foregoing embodiment may be sandwiched between the lower end cover 120 of the oil pump component 100 and the end cover 210 of the motor component 200, so that the oil pump component 100 suspends.

Figure 13:
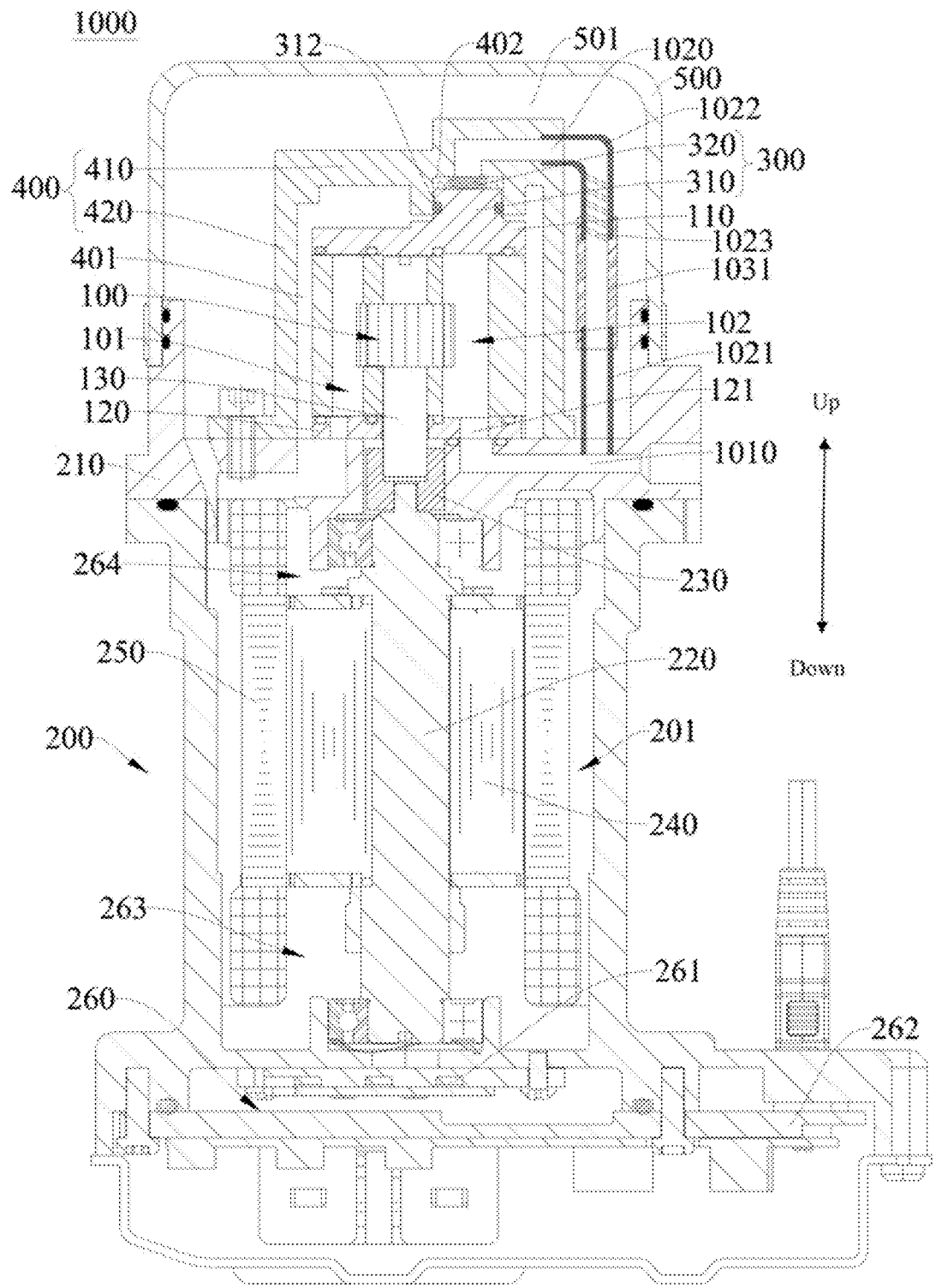
FIG. 13 is a schematic structural diagram of a motor oil pump assembly according to a thirteenth embodiment of the present disclosure.

In still another embodiment, the energy absorption portion may include a hose 1031. Referring to FIG. 13 and FIG. 14, the hose 1031 may be disposed on the high-pressure oil path of the oil pump component 100. For example, the hose 1031 is disposed on the high-pressure oil path between the sound insulation enclosure cavity 402 and the high-pressure cavity 102.

The hose 1031 may be in communication with another oil path through a first hard pipe 1021 and a second hard pipe 1022, one end of the hose 1031 is sleeved on the first hard pipe 1021, and the other end of the hose 1031 is sleeved on the second hard pipe 1022. The hose 1031 may be immersed in the low-pressure oil. For example, in the embodiment in which the outer sound insulation cavity 501 is filled with the low-pressure oil, the hose 1031 may be located in the outer sound insulation cavity 501. For example, the first hard pipe 1021 and the second hard pipe 1022 may be metal pipes, and the hose 1031 may be a rubber pipe. When a ripple is generated in the high-pressure oil path, the hose 1031 may be elastically deformed to increase the diameter of the hose, thereby eliminating the ripple and reducing the noise.

Further, the inner circumferential wall of at least one of the first hard pipe 1021 and the second hard pipe 1022 may be provided with a spiral groove 1023. When the oil liquid passes through the spiral groove 1023, a spiral turbulent flow function of the spiral groove 1023 may further reduce ripples.

Referring to FIG. 13, the high-pressure oil path may include the oil outlet passage 1010 and the oil outlet branch 1020, and the oil outlet passage 1010 is in communication with the high-pressure cavity 102. For example, the oil outlet passage 1010 may be disposed on the end cover 210 of the motor component 200, the oil outlet passage 1010 is connected to the lower end of the high-pressure cavity 102 through the lower passage 121 running through the lower end cover 120, the oil outlet branch 1020 is in communication with the oil outlet passage 1010, and the oil outlet branch 1020 is in communication with the sound insulation enclosure cavity 402. The oil outlet branch 1020 may run through until the top wall of the sound insulation enclosure cavity 402, and the hose 1031 may be disposed on the oil outlet branch 1020. The oil outlet branch 1020 includes the first hard pipe 1021 and the second hard pipe 1022, the first hard pipe 1021 is in communication with the oil outlet passage 1010, the second hard pipe 1022 is in communication with the sound insulation enclosure cavity 402, and the first hard pipe 1021 is connected to the second hard pipe 1022 through the hose 1031. In this embodiment, the hose 1031 is a part of the oil outlet branch 1020.

Referring to FIG. 14, the high-pressure oil path includes the oil outlet passage 1010, the oil outlet passage 1010 is in communication with the sound insulation enclosure cavity 402, the piston 310 is provided with the piston hole 314 running through the piston 310, the piston hole 314 is connected to each of the high-pressure cavity 102 and the sound insulation enclosure cavity 402, the hose 1031 is disposed on the oil outlet passage 1010, the oil outlet passage 1010 further includes the first hard pipe 1021 and the second hard pipe 1022, and the hose 1031 is connected between the first hard pipe 1021 and the second hard pipe 1022. In this embodiment, the hose 1031 is a part of the oil outlet passage 1010. Moreover, in this embodiment, the high-pressure oil is not output through the lower end cover 120, and the buffering gasket 122 described in the foregoing embodiment may be sandwiched between the lower end cover 120 of the oil pump component 100 and the end cover 210 of the motor component 200, so that the oil pump component 100 suspends.

In some embodiments of the present disclosure, referring to FIG. 1 to FIG. 20, the motor component 200 may be of a liquid cooling type, and the motor cavity 201 of the motor component 200 is in communication with the low-pressure cavity 101 of the oil pump component 100. By using an oil absorption negative pressure function of the oil pump component 100, the oil liquid may be driven to flow through the motor cavity 201, thereby implementing liquid cooling and heat dissipation on the motor component 200 in the operating process of the motor oil pump assembly 1000.

In the embodiment in which the outer sound insulation cavity 501 is filled with low-pressure oil and is in communication with the inner sound insulation cavity 401, the oil inlet of the motor oil pump assembly 1000 may be in direct communication with the outer sound insulation cavity 501. To guide the flow direction of the oil liquid, in some embodiments, referring to FIG. 1, FIG. 3 to FIG. 5, and FIG. 11, the partition 502 may be disposed between the outer sound insulation cavity 501 and the inner sound insulation cavity 401. In this way, the flow direction of the oil liquid is: the outer sound insulation cavity 501—the motor cavity 201—the low-pressure cavity 101—the high-pressure cavity 102—the oil outlet passage 1010-steering.

Certainly, the oil inlet of the motor oil pump assembly 1000 may be further disposed on another location. For example, the oil inlet of the motor oil pump assembly 1000 may be disposed on the bottom of an electric control box 260 of the motor component 200.

It may be understood that, heating of the electric control part of the motor component 200 is relatively severe, the oil liquid may enter the motor cavity 201 through the oil inlet on the bottom of the electric control box 260, and the oil liquid first cools the electric control part of the motor component 200. By using the oil absorption negative pressure function of the oil pump component 100, the oil liquid flows to an electric control heat dissipation oil layer 263, to cool a motor three-phase line 261, the electric control part and direct-current alternating-current conversion plate 262, and a cooling oil path may be designed around a stator 250. The oil liquid within the cooling oil path may cool the stator 250, and then the oil liquid reaches the oil absorption port of the oil pump component 100 through the cooling oil path.

A rotor 240 of the motor component 200 may be immersed in the low-pressure oil. In this way, the oil liquid may play a role of delaying rotation of the rotor 240, so as to alleviate problems of rapid acceleration or rapid deceleration of the rotor 240 and excessively large inertia modulus, thereby preventing load rejection of the motor component 200 from impacting the steering oil path, the hand feeling during steering is better, it is not easy for the steering wheel to tremble, and the rotor 240 may form annular agitation for the electric control heat dissipation oil layer 263 and a motor low-pressure lubrication heat dissipation oil layer 264 in an up and down direction, to strengthen cooling effects of the electric control part and the stator 250.

Further, to prevent the load rejection of the motor component 200 from impacting the steering oil path and affecting the hand feeling during steering, an energy storage structure may be added into the oil path, and the rotation speed of the motor component 200 may be further controlled through electric control. For example, when a high speed is reduced, an even acceleration algorithm is performed on the rotation speed of the motor component 200 to reduce the rotation speed, so as to enable load of the motor component 200 and the oil pump component 100 to be slowly reduced when the rotation speed is quickly reduced.

The motor oil pump assembly 1000 according to this embodiment of the present disclosure may be applied to a steering system, the motor shaft 220 of the motor component 200 is connected to the input shaft 130 of the oil pump component 100, a rotation speed n of the motor shaft 220 is controlled according to at least a vehicle speed v and a rotation angle w of a steering wheel, and the pressure and the flow of oil output by the oil pump component 100 may depend on the rotation speed n of the motor shaft 220. Therefore, rotation of vehicle wheels may be controlled.

Based on the motor oil pump assembly 1000 according to the present disclosure, when v=0 km/h, and w≤w1, the rotation speed n of the motor shaft 220 is controlled to satisfy: n3≤n≤n4. For example, w1<5°, 950 rpm≤n3≤1050 rpm, and 1150 rpm≤n4≤1250 rpm. In an embodiment, w1=0°, n1=1000 rpm, and n2=1200 rpm.

In other words, when a vehicle is parked and is under an idling working condition, the steering wheel basically does not operate, the vehicle speed is zero, no signal is input to a CAN communication line of the motor component 200, the motor component 200 drives the oil pump component 100 to run under a low idling working condition, the rotation speed of the motor shaft 220 is lowest, to ensure a heat dissipation requirement of the motor component 200, and the noise of the motor oil pump assembly 1000 is lowest.

Based on the motor oil pump assembly 1000 according to the present disclosure, when v>0 km/h, and w≤w1, the rotation speed n of the motor shaft 220 is controlled to satisfy: n5≤n≤n6. For example, w1<5°, 1450 rpm≤n5≤1550 rpm, and 1550 rpm≤n6≤1650 rpm. In an example, n5=1500 rpm, and n6=1600 rpm.

In other words, when the vehicle is started to run, the steering wheel does not rotate or slightly rotates, the vehicle wheels are not steered, the direct current is tiny, the motor component 200 drives the oil pump component 100 to operate under an idling condition, and the rotation speed of the motor shaft 220 is slightly increased, so as to ensure the steering requirement of the vehicle. Moreover, because road noise has been generated when the vehicle is running, noise generated due to increase in the rotation speed does not exceed or overlap the noise of the vehicle.

Based on the motor oil pump assembly 1000 according to the present disclosure, when v=0 km/h, and w>5°, the rotation speed n of the motor shaft 220 is controlled to be positively correlated to the rotation angle w of the steering wheel.

In other words, when the vehicle is steered in situ, a larger rotation angle of the steering wheel indicates a larger rotation speed of the motor shaft 220, and the pressure and the flow of the hydraulic oil output by the motor oil pump assembly 1000 are also larger, so that the vehicle wheels have a larger rotation angle. Moreover, in this case, the operating noise of the motor oil pump assembly 1000 is slightly greater than road noise of tires, and pedestrians may be reminded with smaller noise that the vehicle is being steered.

The motor oil pump assembly 1000 is set as follows: when 0<v<v1, the rotation speed n of the motor shaft 220 is negatively correlated to the vehicle speed v, and the rotation speed n of the motor shaft 220 is positively correlated to the rotation angle w of the steering wheel.

In other words, when the vehicle travels at a low speed, a lower vehicle speed or a larger rotation angle of the steering wheel indicates a larger rotation speed of the motor shaft 220, and the pressure and the flow of the hydraulic oil output by the motor oil pump assembly 1000 are also larger, so that the vehicle wheels have a larger rotation angle. Moreover, in this case, the pressure and the flow of the hydraulic oil output by the motor oil pump assembly 1000 are substantially a half of those during steering in situ, and the operating noise of the motor oil pump assembly 1000 is less than road noise of tires. Therefore, muted steering may be implemented.

Based on the motor oil pump assembly 1000 according to the present disclosure, when v≥v1, the rotation speed n of the motor shaft 220 is controlled to satisfy: n≤n2.

It may be understood that, when v≥v1, the vehicle travels at a high speed. For example, when v1≥60 km/h, an emergency avoidance measure is usually taken. In this case, the steering flow needs to be controlled, to prevent the vehicle from being turned over due to emergency steering in a high-speed situation. In this case, the rotation speed n of the motor shaft 220 is limited to being not greater ratio n2, that is, the motor component 200 is controlled to run at an intermediate or low speed. For example, 2350 rpm≤n2≤2450 rpm.

Further, based on the motor oil pump assembly 1000 according to the present disclosure, when v≥v1 and w>w1, the rotation speed n of the motor shaft 220 is controlled to satisfy: n1≤n≤n2. To be specific, when the vehicle travels at a high speed, even if the driver violently jerks the steering wheel, the rotation speed n of the motor shaft 220 is controlled to be between n1 and n2, and only fine tuning is performed on the vehicle wheels to implement emergency avoidance. For example, v1≥60 km/h, 1550 rpm≤n1≤1650 rpm, and 2350 rpm≤n2≤2450 rpm. In an embodiment, v1=80 km/h, n1=1600 rpm, and n2=2400 rpm.

For example, the acceleration a of the motor shaft 220 satisfies: a≤a1. To be specific, the maximum acceleration of the motor shaft 220 is controlled, to prevent load rejection of the motor component 200.

It should be noted that, a person skilled in the art may combine characteristics of different embodiments in the present disclosure, as long as they do not conflict with each other. For example, various structure forms of inner sound insulation enclosures 400, various structure forms of pre-tightening buffering components 300, various structure forms of energy absorption portions, various structure forms of oil path directions, and the like may be combined with each other.

Based on the motor oil pump assembly 1000 according to this embodiment of the present disclosure, the motor oil pump assembly 1000 is high in lightweight level, small in occupied space, and low in manufacturing costs, the direct contact area between the oil pump component 100 and another part is small, and sources of secondary noise may be greatly reduced; the sound insulation effect of the motor oil pump assembly 1000 is good, and ripple fluctuation of the motor oil pump assembly 1000 may be reduced by using a method for offsetting oil liquid ripples, to implement active noise reduction of the motor oil pump assembly 1000; and moreover, the operating friction force of the oil pump component 100 is small, so that the operating energy efficiency of the motor oil pump assembly 1000 is high.

Figure 22:
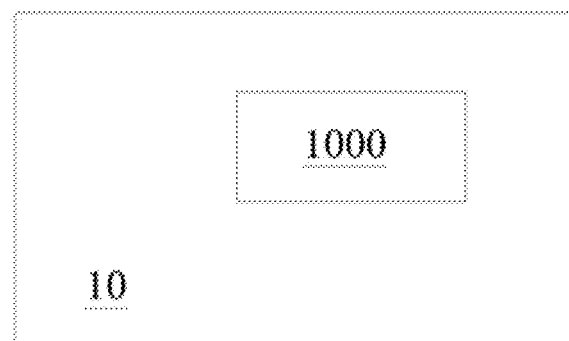
FIG. 22 is a schematic structural diagram of a steering system according to an embodiment of the present disclosure.

The present disclosure further discloses a steering system 10. Referring to FIG. 22, the steering system 10 according to this embodiment of the present disclosure is provided with the motor oil pump assembly 1000 described in any one of the foregoing embodiments.

Figure 23:
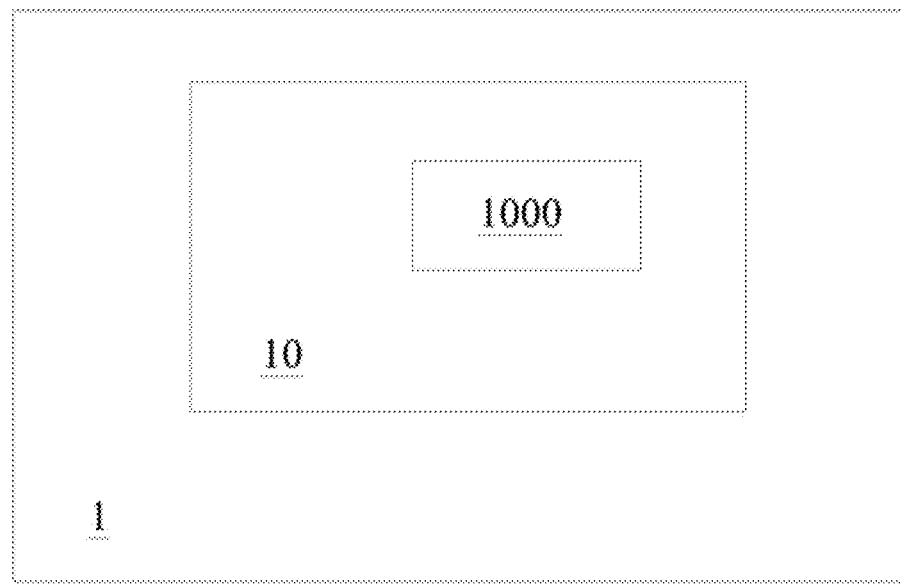
FIG. 23 is a schematic structural diagram of a vehicle according to an embodiment of the present disclosure.

The present disclosure further discloses a vehicle 1. Referring to FIG. 23, the vehicle 1 according to this embodiment of the present disclosure is provided with the steering system 10 described in any one of the foregoing embodiments. For example, the vehicle 1 according to this embodiment of the present disclosure may be a coach.

In addition, unless explicitly specified or limited otherwise, the terms "mounted", "connected", "connection", and "fixed" should be understood broadly, for example, which may be fixed connections, detachable connections or integral connections; may be mechanical connections or electrical connections; may be direct connections, indirectly connected with each other through an intermediate medium, or communications inside two elements or an interaction relationship of two elements, unless otherwise specifically limited. A person of ordinary skill in the art may understand specific meanings of the foregoing terms in this disclosure according to a specific situation.

Although the embodiments of the present disclosure are shown and described above, it can be understood that the foregoing embodiments are exemplary, and should not be construed as limitations to the present disclosure. A person of ordinary skill in the art can make changes, modifications, replacements, and variations to the foregoing embodiments within the scope of the present disclosure.

What is claimed is:

1. A motor oil pump assembly, comprising: a motor component; an oil pump component, wherein the oil pump component is supported on an end cover of the motor component; an inner sound insulation enclosure, wherein the inner sound insulation enclosure encloses the oil pump component, and the inner sound insulation enclosure and the oil pump component define an inner sound insulation cavity filled with low-pressure oil; and a buffer, wherein the buffer is pressed between an upper end cover of the oil pump component and the inner sound insulation enclosure, wherein the upper end cover is provided with an end cover cavity that runs through the upper end cover and that is in communication with a high-pressure cavity of the oil pump component, the end cover cavity is constructed as a stepped hole to form a stepped surface, and the buffer is in communication with the high-pressure cavity of the oil pump component, the buffer comprises: a piston, wherein the piston fits within the end cover cavity to isolate the high-pressure cavity from the inner sound insulation cavity, and presses against the inner sound insulation enclosure, and an elastic member, wherein the elastic member is elastically sandwiched between the piston and the stepped surface.

2. The motor oil pump assembly according to claim 1, wherein the end cover cavity is in communication with an upper end of the high-pressure cavity, and an oil outlet passage of the oil pump component is in communication with a lower end of the high-pressure cavity.

3. The motor oil pump assembly according to claim 2, wherein the oil outlet passage is disposed on the end cover of the motor component, and the oil outlet passage is connected to the lower end of the high-pressure cavity through a lower passage running through a lower end cover.

4. The motor oil pump assembly according to claim 2, wherein an energy absorption portion is disposed on the oil outlet passage of the oil pump component.

5. The motor oil pump assembly according to claim 4, wherein the energy absorption portion is an energy storage cavity, a gas storage tank, or a damping hole.

6. The motor oil pump assembly according to claim 1, wherein an end surface of the piston facing the inner sound insulation enclosure has a protrusion portion, and the protrusion portion presses against the inner sound insulation enclosure.

7. The motor oil pump assembly according to claim 1, wherein the elastic member is a spring.

8. The motor oil pump assembly according to claim 1, wherein a piston seal ring is disposed between the piston and a circumferential wall of the end cover cavity.

9. The motor oil pump assembly according to claim 1, wherein the inner sound insulation enclosure comprises:
a top cover; and
a side skirt, connected to the top cover and the end cover of the motor component.

10. The motor oil pump assembly according to claim 9, wherein the top cover is connected to the side skirt by using a threaded fastening member, and the end cover of the motor component and the side skirt are integrally formed.

11. The motor oil pump assembly according to claim 9, wherein the top cover has a groove opened downward, and the buffer presses against a top wall of the groove.

12. The motor oil pump assembly according to claim 1, wherein the inner sound insulation cavity is in communication with a low-pressure cavity of the oil pump component.

13. The motor oil pump assembly according to claim 1, further comprising: an outer sound insulation enclosure, wherein the outer sound insulation enclosure encloses at least a part of the inner sound insulation enclosure, and an outer sound insulation cavity filled with low-pressure oil is defined between the outer sound insulation enclosure and the inner sound insulation enclosure.

14. The motor oil pump assembly according to claim 13, wherein the inner sound insulation cavity is in communication with the outer sound insulation cavity.

15. The motor oil pump assembly according to claim 1, wherein the motor component is of a liquid cooling type, and a motor cavity of the motor component is in communication with a low-pressure cavity of the oil pump component.

16. A steering system, provided with the motor oil pump assembly according to claim 1.

17. A vehicle, provided with the steering system according to claim 16.

* * * * *